United States Patent
Layman et al.

(10) Patent No.: US 9,834,621 B2
(45) Date of Patent: *Dec. 5, 2017

(54) METHOD FOR PURIFYING CONTAMINATED POLYPROPYLENE

(71) Applicant: The Procter & Gamble Company, Cincinnati, OH (US)

(72) Inventors: John Moncrief Layman, Liberty Township, OH (US); Maggie Gunnerson, Cincinnati, OH (US); Hans Schonemann, Newburyport, MA (US); Kara Williams, South Weymouth, MA (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/190,226

(22) Filed: Jun. 23, 2016

(65) Prior Publication Data

US 2017/0002115 A1    Jan. 5, 2017

Related U.S. Application Data

(60) Provisional application No. 62/186,483, filed on Jun. 30, 2015.

(51) Int. Cl.

| | |
|---|---|
| *C08G 63/02* | (2006.01) |
| *C08F 6/00* | (2006.01) |
| *C08J 11/08* | (2006.01) |
| *C08F 10/06* | (2006.01) |

(52) U.S. Cl.
CPC ............ *C08F 6/00* (2013.01); *C08F 10/06* (2013.01); *C08J 11/08* (2013.01); *C08J 2323/06* (2013.01); *C08J 2323/08* (2013.01); *Y02W 30/701* (2015.05)

(58) Field of Classification Search
CPC .................................. C08F 10/06; C08F 6/00
USPC ........................................................ 528/176
See application file for complete search history.

(56) References Cited

U.S. PATENT DOCUMENTS

| | | |
|---|---|---|
| 2,914,453 A | 11/1959 | Wennerberg |
| 2,978,442 A | 4/1961 | Brightbill et al. |
| 3,001,977 A | 9/1961 | Wisseroth et al. |
| 4,067,826 A | 1/1978 | Emery |
| 5,198,471 A | 3/1993 | Nauman et al. |
| 5,233,021 A | 8/1993 | Sikorski |
| 5,739,270 A | 4/1998 | Farmer et al. |
| 5,994,417 A | 11/1999 | Roberts et al. |
| 6,555,588 B2 | 4/2003 | Gorski et al. |
| 7,935,736 B2 | 5/2011 | Maurer et al. |
| 2001/0044520 A1 | 11/2001 | Suzuki et al. |
| 2017/0002109 A1* | 1/2017 | Layman ............... C08F 6/00 |
| 2017/0002110 A1* | 1/2017 | Layman ............... C08F 6/00 |
| 2017/0002118 A1* | 1/2017 | Layman ............... C08J 11/08 |

FOREIGN PATENT DOCUMENTS

| | | |
|---|---|---|
| EP | 0379394 A1 | 7/1990 |
| EP | 0849312 A1 | 6/1998 |

OTHER PUBLICATIONS

Search Report and Written Report (PCT/US2016/038864) dated Jul. 27, 2016.

* cited by examiner

*Primary Examiner* — Terressa Boykin
(74) *Attorney, Agent, or Firm* — Brent M. Peebles

(57) ABSTRACT

A method for purifying reclaimed polypropylene, such as a polypropylene reclaimed from post-consumer use or post-industrial use, is disclosed. The method involves obtaining the reclaimed polypropylene and contacting it at an elevated temperature and pressure with a fluid solvent to produce an extracted reclaimed polypropylene. The extracted reclaimed polypropylene is dissolved in a solvent at an elevated temperature and pressure to produce a polypropylene solution, which is purified at an elevated temperature and pressure by contacting the polypropylene solution with solid media to produce a purer polypropylene solution. A purer polypropylene is then separated from the purer polypropylene solution.

22 Claims, 4 Drawing Sheets

METHOD FOR PURIFYING CONTAMINATED POLYOLEFINS

US 9,834,621 B2

METHOD FOR PURIFYING CONTAMINATED POLYPROPYLENE

FIELD OF THE INVENTION

The present invention generally relates to a method for purifying contaminated polymers through the use of a pressurized solvent and solid media. More specifically, this invention relates to a method for purifying recycled polymers, such as post-consumer and post-industrial recycled plastics, to produce a colorless or clear, odor free, virgin-like polymer. It is particularly useful for the purification of polypropylene.

BACKGROUND OF THE INVENTION

Polymers, especially synthetic plastics, are ubiquitous in daily life due to their relatively low production costs and good balance of material properties. Synthetic plastics are used in a wide variety of applications, such as packaging, automotive components, medical devices, and consumer goods. To meet the high demand of these applications, tens of billions of pounds of synthetic plastics are produced globally on an annual basis. The overwhelming majority of synthetic plastics are produced from increasingly scarce fossil sources, such as petroleum and natural gas. Additionally, the manufacturing of synthetic plastics from fossil sources produces $CO_2$ as a by-product.

The ubiquitous use of synthetic plastics has consequently resulted in millions of tons of plastic waste being generated every year. While the majority of plastic waste is landfilled via municipal solid waste programs, a significant portion of plastic waste is found in the environment as litter, which is unsightly and potentially harmful to ecosystems. Plastic waste is often washed into river systems and ultimately out to sea.

Plastics recycling has emerged as one solution to mitigate the issues associated with the wide-spread usage of plastics. Recovering and re-using plastics diverts waste from landfills and reduces the demand for virgin plastics made from fossil-based resources, which consequently reduces greenhouse gas emissions. In developed regions, such as the United States and the European Union, rates of plastics recycling are increasing due to greater awareness by consumers, businesses, and industrial manufacturing operations. The majority of recycled materials, including plastics, are mixed into a single stream which is collected and processed by a material recovery facility (MRF). At the MRF, materials are sorted, washed, and packaged for resale. Plastics can be sorted into individual materials, such as high-density polyethylene (HDPE) or poly(ethylene terephthalate) (PET), or mixed streams of other common plastics, such as polypropylene (PP), low-density polyethylene (LDPE), poly(vinyl chloride) (PVC), polystyrene (PS), polycarbonate (PC), and polyamides (PA). The single or mixed streams can then be further sorted, washed, and reprocessed into a pellet that is suitable for re-use in plastics processing, for example blow and injection molding.

Though recycled plastics are sorted into predominately uniform streams and are washed with aqueous and/or caustic solutions, the final reprocessed pellet often remains highly contaminated with unwanted waste impurities, such as spoiled food residue and residual perfume components. In addition, recycled plastic pellets, except for those from recycled beverage containers, are darkly colored due to the mixture of dyes and pigments commonly used to colorize plastic articles. While there are some applications that are insensitive to color and contamination (for example black plastic paint containers and concealed automotive components), the majority of applications require non-colored pellets. The need for high quality, "virgin-like" recycled resin is especially important for food and drug contact applications, such as food packaging. In addition to being contaminated with impurities and mixed colorants, many recycled resin products are often heterogeneous in chemical composition and may contain a significant amount of polymeric contamination, such as polyethylene (PE) contamination in recycled PP and vice versa.

Mechanical recycling, also known as secondary recycling, is the process of converting recycled plastic waste into a re-usable form for subsequent manufacturing. A more detailed review of mechanical recycling and other plastics recovery processes are described in S. M. Al-Salem, P. Lettieri, J. Baeyens, "Recycling and recovery routes of plastic solid waste (PSW): A review", *Waste Management*, Volume 29, Issue 10, October 2009, Pages 2625-2643, ISSN 0956-053X. While advances in mechanical recycling technology have improved the quality of recycled polymers to some degree, there are fundamental limitations of mechanical decontamination approaches, such as the physical entrapment of pigments within a polymer matrix. Thus, even with the improvements in mechanical recycling technology, the dark color and high levels of chemical contamination in currently available recycled plastic waste prevents broader usage of recycled resins by the plastics industry.

To overcome the fundamental limitations of mechanical recycling, there have been many methods developed to purify contaminated polymers via chemical approaches, or chemical recycling. Most of these methods use solvents to decontaminate and purify polymers. The use of solvents enables the extraction of impurities and the dissolution of polymers, which further enables alternative separation technologies.

For example, U.S. Pat. No. 7,935,736 describes a method for recycling polyester from polyester-containing waste using a solvent to dissolve the polyester prior to cleaning. The '736 patent also describes the need to use a precipitant to recover the polyester from the solvent.

In another example, U.S. Pat. No. 6,555,588 describes a method to produce a polypropylene blend from a plastic mixture comprised of other polymers. The '588 patent describes the extraction of contaminants from a polymer at a temperature below the dissolution temperature of the polymer in the selected solvent, such as hexane, for a specified residence period. The '588 patent further describes increasing the temperature of the solvent (or a second solvent) to dissolve the polymer prior to filtration. The '588 patent yet further describes the use of shearing or flow to precipitate polypropylene from solution. The polypropylene blend described in the '588 patent contained polyethylene contamination up to 5.6 wt %.

In another example, European Patent Application No. 849,312 (translated from German to English) describes a process to obtain purified polyolefins from a polyolefin-containing plastic mixture or a polyolefin-containing waste. The '312 patent application describes the extraction of polyolefin mixtures or wastes with a hydrocarbon fraction of gasoline or diesel fuel with a boiling point above 90° C. at temperatures between 90° C. and the boiling point of the hydrocarbon solvent. The '312 patent application further describes contacting a hot polyolefin solution with bleaching clay and/or activated carbon to remove foreign components from the solution. The '312 patent yet further describes cooling the solution to temperatures below 70° C. to crystallize the polyolefin and then removing adhering solvent by heating the polyolefin above the melting point of the polyolefin, or evaporating the adhering solvent in a vacuum or passing a gas stream through the polyolefin precipitate, and/or extraction of the solvent with an alcohol or ketone that boils below the melting point of the polyolefin.

In another example, U.S. Pat. No. 5,198,471 describes a method for separating polymers from a physically commingled solid mixture (for example waste plastics) containing a plurality of polymers using a solvent at a first lower temperature to form a first single phase solution and a remaining solid component. The '471 patent further describes heating the solvent to higher temperatures to dissolve additional polymers that were not solubilized at the first lower temperature. The '471 patent describes filtration of insoluble polymer components.

In another example, U.S. Pat. No. 5,233,021 describes a method of extracting pure polymeric components from a multi-component structure (for example waste carpeting) by dissolving each component at an appropriate temperature and pressure in a supercritical fluid and then varying the temperature and/or pressure to extract particular components in sequence. However, similar to the '471 patent, the '021 patent only describes filtration of undissolved components.

In another example, U.S. Pat. No. 5,739,270 describes a method and apparatus for continuously separating a polymer component of a plastic from contaminants and other components of the plastic using a co-solvent and a working fluid. The co-solvent at least partially dissolves the polymer and the second fluid (that is in a liquid, critical, or supercritical state) solubilizes components from the polymer and precipitates some of the dissolved polymer from the co-solvent. The '270 patent further describes the step of filtering the thermoplastic-co-solvent (with or without the working fluid) to remove particulate contaminants, such as glass particles.

The known solvent-based methods to purify contaminated polymers, as described above, do not produce "virgin-like" polymer. In the previous methods, co-dissolution and thus cross contamination of other polymers often occurs. If adsorbent is used, a filtration and/or centrifugation step is often employed to remove the used adsorbent from solution. In addition, isolation processes to remove solvent, such as heating, vacuum evaporation, and/or precipitation using a precipitating chemical are used to produce a polymer free of residual solvent.

Accordingly, a need still exists for an improved solvent-based method to purify contaminated polymers that uses a solvent that is readily and economically removed from the polymer, is relatively simple in terms of the number of unit operations, produces a polymer without a significant amount of polymeric cross contamination, produces a polymer that is essentially colorless, and produces a polymer that is essentially odorless.

SUMMARY OF THE INVENTION

A method for purifying reclaimed polypropylene is disclosed. The method comprises obtaining the reclaimed polypropylene wherein the reclaimed polypropylene is selected from the group consisting of post-consumer use polymers, post-industrial use polymers, and combinations thereof. The reclaimed polypropylene is contacted at a temperature from about 80° C. to about 220° C. and at a pressure from about 150 psig (1.03 MPa) to about 15,000 psig (103.42 MPa) with a first fluid solvent having a standard boiling point less than about 70° C., to produce an extracted reclaimed polypropylene. The extracted reclaimed polypropylene is dissolved in a solvent selected from the group consisting of the first fluid solvent, a second fluid solvent, and mixtures thereof, at a temperature from about 90° C. to about 220° C. and a pressure from about 350 psig (2.42 MPa) to about 20,000 psig (137.90 MPa) to produce a polypropylene solution. The polypropylene solution is purified at a temperature from about 90° C. to about 220° C. and at a pressure from about 350 psig (2.42 MPa) to about 20,000 psig (137.90 MPa) by contacting the polypropylene solution with solid media to produce a purer polypropylene solution. Then a purer polypropylene is separated from the purer polypropylene solution. In one embodiment, the second fluid solvent has either the same chemical composition or a different chemical composition as the first fluid solvent.

In one embodiment, the purer polypropylene is separated from the purer polypropylene solution at a temperature from about 0° C. to about 220° C. and a pressure from about 0 psig (0 MPa) to about 2,000 psig (13.79 MPa).

In one embodiment, the reclaimed polypropylene is post-consumer recycle derived polypropylene. In another embodiment, the reclaimed polypropylene is a polypropylene homopolymer or a primarily polypropylene copolymer.

In one embodiment, the fluid solvent has a standard boiling point less than about 0° C. and greater than about −45° C. and a standard enthalpy change of vaporization of less than about +25 kJ/mol. In another embodiment, the fluid solvent is selected from the group consisting of olefinic hydrocarbons, aliphatic hydrocarbons, and mixtures thereof.

In one embodiment, the aliphatic hydrocarbon is selected from the group consisting of $C_1$-$C_6$ aliphatic hydrocarbons and mixtures thereof. In another embodiment, the aliphatic hydrocarbons and mixtures thereof is comprised of primarily $C_4$ aliphatic hydrocarbons.

In one embodiment, the fluid solvent consists essentially of $C_4$ liquefied petroleum gas. In another embodiment, the fluid solvent is n-butane, butane isomers, or mixtures thereof.

In one embodiment, the temperature in extraction, dissolution, and purification steps is from about 110° C. to about 170° C.

In one embodiment, the pressure in the contacting step is from about 1,100 psig (7.58 MPa) to about 2,100 psig (14.48 MPa). In another embodiment, the pressure in the contacting step is less than about 1,100 psig (7.58 MPa).

In one embodiment, the pressure in the dissolving step is greater than about 1,100 psig (7.58 MPa). In another embodiment, the pressure in the dissolving step is greater than about 2,100 psig (14.48 MPa).

In one embodiment, the solid media is selected from the group consisting of inorganic substances, carbon-based substances, and mixtures thereof. In another embodiment, the inorganic substances are selected from the group consisting of oxides of silicon, oxides of aluminum, oxides of iron, aluminum silicates, amorphous volcanic glasses, and mixtures thereof. In another embodiment, the inorganic substances are selected from the group consisting of silica, silica gel, diatomite, sand, quartz, alumina, perlite, fuller's earth, bentonite, and mixtures thereof. In another embodiment, the inorganic substance is reclaimed glass.

In one embodiment, the carbon-based substances are selected from the group consisting of anthracite coal, carbon black, coke, activated carbon, cellulose, and mixtures thereof. In another embodiment, the contacting of the polypropylene solution with the solid media is done in a packed bed of the solid media. In one embodiment, the packed bed is greater than 20 cm in length.

Additional features of the invention may become apparent to those skilled in the art from a review of the following detailed description, taken in conjunction with the examples.

DETAILED DESCRIPTION OF THE INVENTION

I. Definitions

Figure 1:
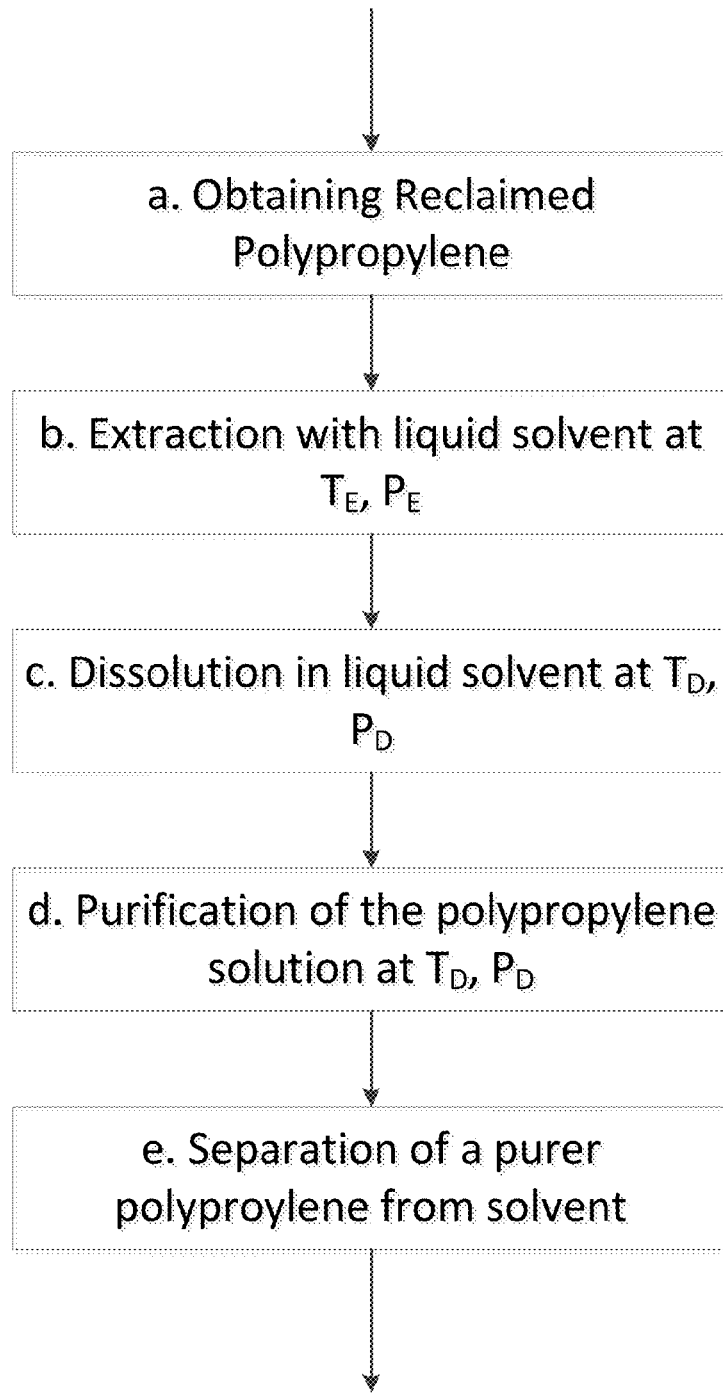
FIG. 1 is a block flow diagram showing the major steps of one embodiment of the present invention.

As used herein, the term "reclaimed polymer" refers to a polymer used for a previous purpose and then recovered for further processing.

As used herein, the term "reclaimed polypropylene" (rPP) refers to a polypropylene polymer used for a previous purpose and then recovered for further processing.

As used herein, the term "post-consumer" refers to a source of material that originates after the end consumer has used the material in a consumer good or product.

As used herein, the term "post-consumer recycle" (PCR) refers to a material that is produced after the end consumer has used the material and has disposed of the material in a waste stream.

As used herein, the term "post-industrial" refers to a source of a material that originates during the manufacture of a good or product.

As used herein, the term "fluid solvent" refers to a substance that may exist in the liquid state under specified conditions of temperature and pressure. In some embodiments the fluid solvent may be a predominantly homogenous chemical composition of one molecule or isomer, while in other embodiments, the fluid solvent may be a mixture of several different molecular compositions or isomers. Further, in some embodiments of the present invention, the term "fluid solvent" may also apply to substances that are at, near, or above the critical temperature and critical pressure (critical point) of that substance. It is well known to those having ordinary skill in the art that substances above the critical point of that substance are known as "supercritical fluids" which do not have the typical physical properties (i.e. density) of a liquid.

As used herein, the term "dissolved" means at least partial incorporation of a solute (polymeric or non-polymeric) in a solvent at the molecular level. Further, the thermodynamic stability of the solute/solvent solution can be described by the following equation 1:

$$\Delta G_{mix} = \Delta H_m - T \Delta S_{mix} \quad (I)$$

where $\Delta G_{mix}$ is the Gibbs free energy change of mixing of a solute with a solvent, $\Delta H_{mix}$ is the enthalpy change of mixing, T is the absolute temperature, and $\Delta S_{mix}$ is the entropy of mixing. To maintain a stable solution of a solute in a solvent, the Gibbs free energy must be negative and at a minimum. Thus, any combination of solute and solvent that minimize a negative Gibbs free energy at appropriate temperatures and pressures can be used for the present invention.

As used herein, the term "standard boiling point" refers to the boiling temperature at an absolute pressure of exactly 100 kPa (1 bar, 14.5 psia, 0.9869 atm) as established by the International Union of Pure and Applied Chemistry (IUPAC).

As used herein, the term "standard enthalpy change of vaporization" refers to the enthalpy change required to transform a specified quantity of a substance from a liquid into a vapor at the standard boiling point of the substance.

As used herein, the term "polypropylene solution" refers to a solution of polypropylene dissolved in a solvent. The polypropylene solution may contain undissolved matter and thus the polypropylene solution may also be a "slurry" of undissolved matter suspended in a solution of polypropylene dissolved in a solvent.

As used herein, the term "solid media" refers to a substance that exists in the solid state under the conditions of use. The solid media may be crystalline, semi-crystalline, or amorphous. The solid media may be granular and may be supplied in different shapes (i.e. spheres, cylinders, pellets, etc.). If the solid media is granular, the particle size and particle size distribution of solid media may be defined by the mesh size used to classify the granular media. An example of standard mesh size designations can be found in the American Society for Testing and Material (ASTM) standard ASTM E11 "Standard Specification for Woven Wire Test Sieve Cloth and Test Sieves." The solid media may also be a non-woven fibrous mat or a woven textile.

As used herein, the term "purer polypropylene solution" refers to a polypropylene solution having fewer contaminants relative to the same polypropylene solution prior to a purification step.

As used herein, the term "virgin-like" means essentially contaminant-free, pigment-free, odor-free, homogenous, and similar in properties to virgin polymers.

As used herein, the term "primarily polypropylene copolymer" refers a copolymer with greater than 70 mol % of propylene repeating units.

II. Method for Purifying Contaminated Polypropylene

Surprisingly, it has been found that certain fluid solvents, which in a preferred embodiment exhibit temperature and pressure-dependent solubility for polymers, when used in a relatively simple process can be used to purify contaminated polymers, especially reclaimed or recycled polymers, to a near virgin-like quality. This process, exemplified in FIG. 1, comprises 1) obtaining a reclaimed polypropylene (step a in FIG. 1), followed by 2) extracting the polypropylene with a fluid solvent at an extraction temperature ($T_E$) and at an extraction pressure ($P_E$) (step b in FIG. 1), followed by 3) dissolution of the polypropylene in a fluid solvent at a dissolution temperature ($T_D$) and at a dissolution pressure ($P_D$) (step c in FIG. 1), followed by 4) contacting the dissolved polypropylene solution with solid media at a dissolution temperature ($T_D$) and at a dissolution pressure ($P_D$) (step d in FIG. 1), followed by separation of the polypropylene from the fluid solvent (step e in FIG. 1). In one embodiment of the present invention, the purified polypropylene, which may be sourced from post-consumer waste streams, are essentially contaminant-free, pigment-free, odor-free, homogenous, and similar in properties to virgin polypropylene. Furthermore, in a preferred embodiment, the physical properties of the fluid solvent of the present invention may enable more energy efficient methods for separation of the fluid solvent from the purified polypropylene.

Reclaimed Polypropylene

In one embodiment of the present invention, a method for purifying reclaimed polypropylene includes obtaining reclaimed polypropylene. For the purposes of the present invention, the reclaimed polypropylene is sourced from post-consumer, post-industrial, post-commercial, and/or other special waste streams. For example, post-consumer waste polypropylene can be derived from curbside recycle streams where end-consumers place used polymers from packages and products into a designated bin for collection by a waste hauler or recycler. Post-consumer waste polymers can also be derived from in-store "take-back" programs where the consumer brings waste polymers into a store and places the waste polymers in a designated collection bin. An example of post-industrial waste polymers can be waste polymers produced during the manufacture or shipment of a good or product that are collected as unusable material by the manufacturer (i.e. trim scraps, out of specification material, start up scrap). An example of waste polymers from a special waste stream can be waste polymers derived from the recycling of electronic waste, also known as e-waste. Another example of waste polymers from a special waste stream can be waste polymers derived from the recycling of automobiles. Another example of waste polymers from a special waste stream can be waste polymers derived from the recycling of used carpeting and textiles.

For the purposes of the present invention, the reclaimed polypropylene is a homogenous composition of an individual polymer or a mixture of several different polypropylene compositions. Non-limiting examples of polypropylene compositions are homopolymers of propylene, copolymers of propylene and ethylene (including "impact" and "random-clarified" copolymers), copolymers of propylene and alpha-olefins, polypropylene rubbers, and other dissolvable polypropylene compositions that may be apparent to those having ordinary skill in the art.

The reclaimed polypropylene may also contain various pigments, dyes, process aides, stabilizing additives, fillers, and other performance additives that were added to the polymer during polymerization or conversion of the original polymer to the final form of an article. Non-limiting examples of pigments are organic pigments, such as copper phthalocyanine, inorganic pigments, such as titanium dioxide, and other pigments that may be apparent to those having ordinary skill in the art. A non-limiting example of an organic dye is Basic Yellow 51. Non-limiting examples of process aides are antistatic agents, such as glycerol monostearate and slip-promoting agents, such as erucamide. A non-limiting example of a stabilizing additive is octadecyl-3-(3,5-di-tert.butyl-4-hydroxyphenyl)-propionate. Non-limiting examples of fillers are calcium carbonate, talc, and glass fibers.

Solvent

The fluid solvent of the present invention has a standard boiling point less than about 70° C. Pressurization maintains solvents, which have standard boiling points below the operating temperature range of the present invention, in a state in which there is little or no solvent vapor. In one embodiment, the fluid solvent with a standard boiling point less than about 70° C. is selected from the group consisting of carbon dioxide, ketones, alcohols, ethers, esters, alkenes, alkanes, and mixtures thereof. Non-limiting examples of fluid solvents with standard boing points less than about 70° C. are carbon dioxide, acetone, methanol, dimethyl ether, diethyl ether, ethyl methyl ether, tetrahydrofuran, methyl acetate, ethylene, propylene, 1-butene, 2-butene, isobutylene, 1-pentene, 2-pentene, branched isomers of pentene, 1-hexene, 2-hexene, methane, ethane, propane, n-butane, isobutane, n-pentane, isopentane, neopentane, n-hexane, isomers of isohexane, and other substances that may be apparent to those having ordinary skill in the art.

The selection of the fluid solvent used will dictate the temperature and pressure ranges used to perform the steps of the present invention. A review of polymer phase behavior in solvents of the kind described by the present invention is provided in the following reference: McHugh et al. (1999) Chem. Rev. 99:565-602.

Extraction

In one embodiment of the present invention, a method for purifying polypropylene includes contacting reclaimed polypropylene with a fluid solvent at a temperature and at a pressure wherein the polymer is essentially insoluble in the fluid solvent. Although not wishing to be bound by any theory, applicants believe that the temperature and pressure-dependent solubility can be controlled in such a way to prevent the fluid solvent from fully solubilizing the polymer, however, the fluid solvent can diffuse into the polymer and extract any extractable contamination. The extractable contamination may be residual processing aides added to the polymer, residual product formulations which contacted the polymer, such as perfumes and flavors, dyes, and any other extractable material that may have been intentionally added or unintentionally became incorporated into the polymer, for example, during waste collection and subsequent accumulation with other waste materials.

In one embodiment, the controlled extraction may be accomplished by fixing the temperature of the polymer/fluid solvent system and then controlling the pressure below a pressure, or pressure range, where the polymer dissolves in the fluid solvent. In another embodiment, the controlled extraction is accomplished by fixing the pressure of the polymer/solvent system and then controlling the temperature below a temperature, or temperature range where the polymer dissolves in the fluid solvent. The temperature and pressure-controlled extraction of the polymer with a fluid solvent uses a suitable pressure vessel and may be configured in a way that allows for continuous extraction of the polymer with the fluid solvent. In one embodiment of the present invention, the pressure vessel may be a continuous liquid-liquid extraction column where molten polymer is pumped into one end of the extraction column and the fluid solvent is pumped into the same or the opposite end of the extraction column. In another embodiment, the fluid containing extracted contamination is removed from the process. In another embodiment, the fluid containing extracted contamination is purified, recovered, and recycled for use in the extraction step or a different step in the process. In one embodiment of the present invention, the extraction may be performed as a batch method, wherein the reclaimed polypropylene is fixed in a pressure vessel and the fluid solvent is continuously pumped through the fixed polymer phase. The extraction time or the amount of fluid solvent used will depend on the desired purity of the final purer polymer and the amount of extractable contamination in the starting reclaimed polypropylene. In another embodiment, the fluid containing extracted contamination is contacted with solid media in a separate step as described in the "Purification" section below. In another embodiment, a method for purifying reclaimed polypropylene includes contacting reclaimed polypropylene with a fluid solvent at a temperature and at a pressure wherein the polymer is molten and in the liquid state. In another embodiment, the reclaimed polypropylene is contacted with the fluid solvent at a temperature and at a pressure wherein the polymer is in the solid state.

In one embodiment, a method for purifying reclaimed polypropylene includes contacting polypropylene with a fluid solvent at a temperature and a pressure wherein the polypropylene remains essentially undissolved. In another embodiment, a method for purifying reclaimed polypropylene includes contacting polypropylene with n-butane at a temperature from about 80° C. to about 220° C. In another embodiment, a method for purifying reclaimed polypropylene includes contacting polypropylene with n-butane at a temperature from about 100° C. to about 200° C. In another embodiment, a method for purifying reclaimed polypropylene includes contacting polypropylene with n-butane at a temperature from about 130° C. to about 180° C. In another embodiment, a method for purifying reclaimed polypropylene includes contacting polypropylene with n-butane at a pressure from about 150 psig (1.03 MPa) to about 3,000 psig (20.68 MPa). In another embodiment, a method for purifying reclaimed polypropylene includes contacting polypropylene with n-butane at a pressure from about 1,000 psig (6.89 MPa) to about 2,750 psig (18.96 MPa). In another embodiment, a method for purifying reclaimed polypropylene includes contacting polypropylene with n-butane at a pressure from about 1,500 psig (10.34 MPa) to about 2,500 psig (17.24 MPa).

In another embodiment, a method for purifying reclaimed polypropylene includes contacting polypropylene with propane at a temperature from about 80° C. to about 220° C. In another embodiment, a method for purifying reclaimed polypropylene includes contacting polypropylene with propane at a temperature from about 100° C. to about 200° C. In another embodiment, a method for purifying reclaimed polypropylene includes contacting polypropylene with propane at a temperature from about 130° C. to about 180° C. In another embodiment, a method for purifying reclaimed polypropylene includes contacting polypropylene with propane at a pressure from about 200 psig (1.38 MPa) to about 8,000 psig (55.16 MPa). In another embodiment, a method for purifying reclaimed polypropylene includes contacting polypropylene with propane at a pressure from about 1,000 psig (6.89 MPa) to about 6,000 psig (41.37 MPa). In another embodiment, a method for purifying reclaimed polypropylene includes contacting polypropylene with propane at a pressure from about 2,000 psig (13.79 MPa) to about 4,000 psig (27.58 MPa).

Dissolution

In one embodiment of the present invention, a method for purifying reclaimed polypropylene includes dissolving the reclaimed polypropylene in a fluid solvent at a temperature and at a pressure wherein the polymer is dissolved in the fluid solvent. Although not wishing to be bound by any theory, applicants believe that the temperature and pressure can be controlled in such a way to enable thermodynamically favorable dissolution of the reclaimed polymer in a fluid solvent. Furthermore, the temperature and pressure can be controlled in such a way to enable dissolution of a particular polymer or polymer mixture while not dissolving other polymers or polymer mixtures. This controllable dissolution enables the separation of polymers from polymer mixtures.

In one embodiment of the present invention, a method for purifying polymers includes dissolving contaminated reclaimed polypropylene in a solvent that does not dissolve the contaminants under the same conditions of temperature and pressure. The contaminants may include pigments, fillers, dirt, and other polymers. These contaminants are released from the reclaimed polypropylene upon dissolution and then removed from the polymer solution via a subsequent solid-liquid separation step.

In one embodiment, a method for purifying reclaimed polypropylene includes dissolving polypropylene in a fluid solvent at a temperature and a pressure wherein the polypropylene is dissolved in the fluid solvent. In another embodiment, a method for purifying reclaimed polypropylene includes dissolving polypropylene in n-butane at a temperature from about 90° C. to about 220° C. In another embodiment, a method for purifying reclaimed polypropylene includes dissolving polypropylene in n-butane at a temperature from about 100° C. to about 200° C. In another embodiment, a method for purifying reclaimed polypropylene includes dissolving polypropylene in n-butane at a temperature from about 130° C. to about 180° C. In another embodiment, a method for purifying reclaimed polypropylene includes dissolving polypropylene in n-butane at a pressure from about 350 psig (2.41 MPa) to about 4,000 psig (27.57 MPa). In another embodiment, a method for purifying reclaimed polypropylene includes dissolving polypropylene in n-butane at a pressure from about 1,000 psig (6.89 MPa) to about 3,500 psig (24.13 MPa). In another embodiment, a method for purifying reclaimed polypropylene includes dissolving polypropylene in n-butane at a pressure from about 2,000 psig (13.79 MPa) to about 3,000 psig (20.68 MPa).

In another embodiment, a method for purifying reclaimed polypropylene includes dissolving polypropylene in propane at a temperature from about 90° C. to about 220° C. In another embodiment, a method for purifying reclaimed polypropylene includes dissolving polypropylene in propane at a temperature from about 100° C. to about 200° C. In another embodiment, a method for purifying reclaimed polypropylene includes dissolving polypropylene in propane at a temperature from about 130° C. to about 180° C. In another embodiment, a method for purifying reclaimed polypropylene includes dissolving polypropylene in propane at a pressure from about 2,000 psig (13.79 MPa) to about 8,000 psig (55.16 MPa). In another embodiment, a method for purifying reclaimed polypropylene includes dissolving polypropylene in propane at a pressure from about 3,000 psig (20.68 MPa) to about 6,000 psig (41.37 MPa). In another embodiment, a method for purifying reclaimed polypropylene includes dissolving polypropylene in propane at a pressure from about 3,500 psig (24.13 MPa) to about 5,000 psig (34.47 MPa).

Purification

In one embodiment of the present invention, a method for purifying polypropylene includes contacting a contaminated polymer solution with solid media at a temperature and at a pressure wherein the polymer remains dissolved in the fluid solvent. The solid media of the present invention is any solid material that removes at least some of the contamination from a solution of reclaimed polypropylene dissolved in the fluid solvent of the present invention. Although not wishing to be bound by any theory, the applicants believe that the solid media removes contamination by a variety of mechanisms. Non-limiting examples of possible mechanisms include adsorption, absorption, size exclusion, ion exclusion, ion exchange, and other mechanisms that may be apparent to those having ordinary skill in the art. Furthermore, the pigments and other contaminants commonly found in reclaimed polypropylene may be polar compounds and may preferentially interact with the solid media, which may also be at least slightly polar. The polar-polar interactions are especially favorable when non-polar solvents, such as alkanes, are used as the fluid solvent.

In one embodiment of the present invention, the solid media is selected from the group consisting of inorganic substances, carbon-based substances, or mixtures thereof. Useful examples of inorganic substances include oxides of silicon, oxides of aluminum, oxides of iron, aluminum silicates, magnesium silicates, amorphous volcanic glasses, silica, silica gel, diatomite, sand, quartz, reclaimed glass, alumina, perlite, fuller's earth, bentonite, and mixtures thereof. Useful examples of carbon-based substances include anthracite coal, carbon black, coke, activated carbon, cellulose, and mixtures thereof. In another embodiment of the present invention, the solid media is recycled glass.

In one embodiment of the present invention, the solid media is contacted with the polymer in a vessel for a specified amount of time while the solid media is agitated. In another embodiment, the solid media is removed from the purer polymer solution via a solid-liquid separation step. Non-limiting examples of solid-liquid separation steps include filtration, decantation, centrifugation, and settling. In another embodiment of the present invention, the contaminated polymer solution is passed through a stationary bed of solid media. In another embodiment of the present invention, the height or length of the stationary bed of solid media is greater than 5 cm. In another embodiment of the present invention, the height or length of the stationary bed of solid media is greater than 10 cm. In another embodiment of the present invention, the height or length of the stationary bed of solid media is greater than 20 cm. In another embodiment of the present invention, the solid media is replaced as needed to maintain a desired purity of polymer. In yet another embodiment, the solid media is regenerated and re-used in the purification step. In another embodiment, the solid media is regenerated by fluidizing the solid media during a backwashing step.

In one embodiment, a method for purifying reclaimed polypropylene includes contacting a polypropylene/fluid solvent solution with solid media at a temperature and at a pressure wherein the polypropylene remains dissolved in the fluid solvent. In another embodiment, a method for purifying reclaimed polypropylene includes contacting a polypropylene/n-butane solution with solid media at a temperature from about 90° C. to about 220° C. In another embodiment, a method for purifying reclaimed polypropylene includes contacting a polypropylene/n-butane solution with solid media at a temperature from about 100° C. to about 200° C. In another embodiment, a method for purifying reclaimed polypropylene includes contacting a polypropylene/n-butane solution with solid media at a temperature from about 130° C. to about 180° C. In another embodiment, a method for purifying reclaimed polypropylene includes contacting a polypropylene/n-butane solution with solid media at a pressure from about 350 psig (2.41 MPa) to about 4,000 psig (27.57 MPa). In another embodiment, a method for purifying reclaimed polypropylene includes contacting a polypropylene/n-butane solution with solid media at a pressure from about 1,000 psig (6.89 MPa) to about 3,500 psig (24.13 MPa). In another embodiment, a method for purifying reclaimed polypropylene includes contacting a polypropylene/n-butane solution with solid media at a pressure from about 2,000 psig (13.79 MPa) to about 3,000 psig (20.68 MPa).

In another embodiment, a method for purifying reclaimed polypropylene includes contacting a polypropylene/propane solution with solid media at a temperature from about 90° C. to about 220° C. In another embodiment, a method for purifying reclaimed polypropylene includes contacting a polypropylene/propane solution with solid media at a temperature from about 100° C. to about 200° C. In another embodiment, a method for purifying reclaimed polypropylene includes contacting a polypropylene/propane solution with solid media at a temperature from about 130° C. to about 180° C. In another embodiment, a method for purifying reclaimed polypropylene includes contacting a polypropylene/propane solution with solid media at a pressure from about 2,000 psig (13.79 MPa) to about 8,000 psig (55.16 MPa). In another embodiment, a method for purifying reclaimed polypropylene includes contacting a polypropylene/propane solution with solid media at a pressure from about 3,000 psig (20.68 MPa) to about 6,000 psig (41.37 MPa). In another embodiment, a method for purifying reclaimed polypropylene includes contacting a polypropylene/propane solution with solid media at a pressure from about 3,500 psig (24.13 MPa) to about 5,000 psig (34.47 MPa).

Separation

In one embodiment of the present invention, a method for purifying reclaimed polypropylene includes separating the purer polymer from the fluid solvent at a temperature and at a pressure wherein the polymer precipitates from solution and is no longer dissolved in the fluid solvent. In another embodiment, the precipitation of the purer polymer from the fluid solvent is accomplished by reducing the pressure at a fixed temperature. In another embodiment, the precipitation of the purer polymer from the fluid solvent is accomplished by reducing the temperature at a fixed pressure. In another embodiment, the precipitation of the purer polymer from the fluid solvent is accomplished by increasing the temperature at a fixed pressure. In another embodiment, the precipitation of the purer polymer from the fluid solvent is accomplished by reducing both the temperature and pressure. The solvent can be partially or completely converted from the liquid to the vapor phase by controlling the temperature and pressure. In another embodiment, the precipitated polymer is separated from the fluid solvent without completely converting the fluid solvent into a 100% vapor phase by controlling the temperature and pressure of the solvent during the separation step. The separation of the precipitated purer polymer is accomplished by any method of liquid-liquid or liquid-solid separation. Non-limiting examples of liquid-liquid or liquid-solid separations include filtration, decantation, centrifugation, and settling.

In one embodiment, a method for purifying reclaimed polypropylene includes separating polypropylene from a polypropylene/fluid solvent solution at a temperature and at a pressure wherein the polypropylene precipitates from solution. In another embodiment, a method for purifying reclaimed polypropylene includes separating polypropylene from a polypropylene/n-butane solution at a temperature from about 0° C. to about 220° C. In another embodiment, a method for purifying reclaimed polypropylene includes separating polypropylene from a polypropylene/n-butane solution at a temperature from about 100° C. to about 200° C. In another embodiment, a method for purifying reclaimed polypropylene includes separating polypropylene from a polypropylene/n-butane solution at a temperature from about 130° C. to about 180° C. In another embodiment, a method for purifying reclaimed polypropylene includes separating polypropylene from a polypropylene/n-butane solution at a pressure from about 0 psig (0 MPa) to about 2,000 psig (13.79 MPa). In another embodiment, a method for purifying reclaimed polypropylene includes separating polypropylene from a polypropylene/n-butane solution at a pressure from about 50 psig (0.34 MPa) to about 1,500 psig (10.34 MPa). In another embodiment, a method for purifying reclaimed polypropylene includes separating polypropylene from a polypropylene/n-butane solution at a pressure from about 75 psig (0.52 MPa) to about 1,000 psig (6.89 MPa).

In another embodiment, a method for purifying reclaimed polypropylene includes separating polypropylene from a polypropylene/propane solution at a temperature from about −42° C. to about 220° C. In another embodiment, a method for purifying reclaimed polypropylene includes separating polypropylene from a polypropylene/propane solution at a temperature from about 0° C. to about 150° C. In another embodiment, a method for purifying reclaimed polypropylene includes separating polypropylene from a polypropylene/propane solution at a temperature from about 50° C. to about 130° C. In another embodiment, a method for purifying reclaimed polypropylene includes separating polypropylene from a polypropylene/propane solution at a pressure from about 0 psig (0 MPa) to about 6,000 psig (41.37 MPa). In another embodiment, a method for purifying reclaimed polypropylene includes separating polypropylene from a polypropylene/propane solution at a pressure from about 50 psig (0.34 MPa) to about 3,000 psig (20.68 MPa). In another embodiment, a method for purifying reclaimed polypropylene includes separating polypropylene from a polypropylene/propane solution at a pressure from about 75 psig (0.52 MPa) to about 1,000 psig (6.89 MPa).

III Test Methods

The test methods described herein are used to measure the effectiveness of various methods for purifying polymers. Specifically, the methods described demonstrate the effectiveness of a given purification method at improving color and translucency/clarity (i.e. making the color and opacity of the reclaimed polypropylene closer to that of an uncolored virgin polymer), reducing or eliminating elemental contamination (i.e. removing heavy metals), reducing or eliminating non-combustible contamination (i.e. inorganic fillers), reducing or eliminating volatile compounds (especially volatile compounds that contribute to the malodor of reclaimed polypropylene), and reducing or eliminating polymeric contamination (i.e. polyethylene contamination in polypropylene).

Color and Opacity Measurement:

The color and opacity/translucency of a polymer are important parameters that determine whether or not a polymer can achieve the desired visual aesthetics of an article manufactured from the polymer. Reclaimed polypropylene, especially post-consumer derived reclaimed polypropylene, is typically dark in color and opaque due to residual pigments, fillers, and other contamination. Thus, color and opacity measurements are important parameters in determining the effectiveness of a method for purifying polymers.

Prior to color measurement, samples of either polymeric powders or pellets were compression molded into 30 mm wide×30 mm long×1 mm thick square test specimens (with rounded corners). Powder samples were first densified at room temperature (ca. 20-23° C.) by cold pressing the powder into a sheet using clean, un-used aluminum foil as a contact-release layer between stainless steel platens. Approximately 0.85 g of either cold-pressed powder or pellets was then pressed into test specimens on a Carver Press Model C (Carver, Inc., Wabash, Ind. 46992-0554 USA) pre-heated to 200° C. using aluminum platens, unused aluminum foil release layers, and a stainless steel shim with a cavity corresponding to aforementioned dimensions of the square test specimens. Samples were heated for 5 minutes prior to applying pressure. After 5 minutes, the press was then compressed with at least 2 tons (1.81 metric tons) of hydraulic pressure for at least 5 seconds and then released. The molding stack was then removed and placed between two thick flat metal heat sinks for cooling. The aluminum foil contact release layers were then peeled from the sample and discarded. The flash around the sample on at least one side was peeled to the mold edge and then the sample was pushed through the form. Each test specimen was visually evaluated for voids/bubble defects and only samples with no defects in the color measurement area (0.7" (17.78 mm) diameter minimum) were used for color measurement.

The color of each sample was characterized using the International Commission on Illumination (CIE) L*, a*, b* three dimensional color space. The dimension L* is a measure of the lightness of a sample, with L*=0 corresponding to the darkest black sample and L*=100 corresponding to the brightest white sample. The dimension a* is a measure of the red or green color of a sample with positive values of a* corresponding with a red color and negative values of a* corresponding with a green color. The dimension b* is a measure of the blue or yellow color of a sample with positive values of b* corresponding with a blue color and negative values of b* corresponding with a yellow color. The L*a*b* values of each 30 mm wide×30 mm long×1 mm thick square test specimen sample were measured on a HunterLab model LabScan XE spectrophotometer (Hunter Associates Laboratory, Inc., Reston, Va. 20190-5280, USA). The spectrophotometer was configured with D65 as the standard illuminant, an observer angle of 10°, an area diameter view of 1.75" (44.45 mm), and a port diameter of 0.7" (17.78 mm).

The opacity of each sample, which is a measure of how much light passes through the sample (i.e. a measure of the sample's translucency), was determined using the aforementioned HunterLab spectrophotometer using the contrast ratio opacity mode. Two measurements were made to determine the opacity of each sample. One to measure the brightness value of the sample backed with a white backing, $Y_{White\ Backing}$, and one to measure the brightness value of the sample backed with a black backing, $Y_{BlackBacking}$. The opacity was then calculated from the brightness values using the following equation 2:

$$\% \text{ Opacity} = \frac{Y_{Black\ Backing}}{Y_{White\ Backing}} * 100 \tag{II}$$

Elemental Analysis:

Many sources of reclaimed polypropylene have unacceptably high concentrations of heavy metal contamination. The presence of heavy metals, for example lead, mercury, cadmium, and chromium, may prevent the use of reclaimed polypropylene in certain applications, such as food or drug contact applications or medical device applications. Thus, measuring the concentration of heavy metals is important when determining the effectiveness of a method for purifying polymers.

Elemental analysis was performed using Inductively Coupled Plasma Mass Spectrometry (ICP-MS). Test solutions were prepared in n=2 to n=6 depending on sample availability by combining ~0.25 g sample with 4 mL of concentrated nitric acid and 1 mL of concentrated hydrofluoric acid (HF). The samples were digested using an Ultrawave Microwave Digestion protocol consisting of a 20 min ramp to 125° C., a 10 min ramp to 250° C. and a 20 min hold at 250° C. Digested samples were cooled to room temperature. The digested samples were diluted to 50 mL after adding 0.25 mL of 100 ppm Ge and Rh as the internal standard. In order to assess accuracy of measurement, pre-digestion spikes were prepared by spiking virgin polymer. Virgin polymer spiked samples were weighed out using the same procedure mentioned above and spiked with the appropriate amount of each single element standard of interest, which included the following: Na, Al, Ca, Ti, Cr, Fe, Ni, Cu, Zn, Cd, and Pb. Spikes were prepared at two different levels: a "low level spike" and a "high level spike". Each spike was prepared in triplicate. In addition to spiking virgin polymer, a blank was also spiked to verify that no errors occurred during pipetting and to track recovery through the process. The blank spiked samples were also prepared in triplicate at the two different levels and were treated in the same way as the spiked virgin polymer and the test samples. A 9 point calibration curve was made by making 0.05, 0.1, 0.5, 1, 5, 10, 50, 100, and 500 ppb solutions containing Na, Al, Ca, Ti, Cr, Fe, Ni, Cu, Zn, Cd, and Pb. All calibration standards were prepared by dilution of neat standard reference solutions and 0.25 mL of 100 ppm Ge and Rh as the internal standard with 4 mL of concentrated nitric and 1 mL of concentrated HF. Prepared standards, test samples, and spiked test samples were analyzed using an Agilent's 8800 ICP-QQQMS, optimized according to manufacturer recommendations. The monitored m/z for each analyte and the collision cell gas that was used for analysis was as follows: Na, 23 m/z, $H_2$; Al, 27 m/z, $H_2$; Ca, 40 m/z, $H_2$; Ti, 48 m/z, $H_2$; Cr, 52 m/z, He; Fe, 56 m/z, $H_2$; Ni, 60 m/z; no gas; Cu, 65 m/z, no gas; Zn, 64 m/z, He; Cd, 112 m/z; $H_2$; Pb, sum of 206≥206, 207≥207, 208≥208 m/z, no gas; Ge, 72 m/z, all modes; Rh, 103 m/z, all modes. Ge was used as an internal standard for all elements <103 m/z and Rh was used for all elements >103 m/z.

Residual Ash Content:

Many sources of reclaimed polypropylene contain various fillers, for example calcium carbonate, talcum, and glass fiber. While useful in the original application of the reclaimed polypropylene, these fillers alter the physical properties of a polymer in way that may be undesired for the next application of the reclaimed polypropylene. Thus, measuring the amount of filler is important when determining the effectiveness of a method for purifying polymers.

Thermogravimetric analysis (TGA) was performed to quantify the amount of non-combustible materials in the sample (also sometimes referred to as Ash Content). About 5-15 mg of sample was loaded onto a platinum sample pan and heated to 700° C. at a rate of 20° C./min in an air atmosphere in a TA Instruments model Q500 TGA instrument. The sample was held isothermal for 10 min at 700° C. The percentage residual mass was measured at 700° C. after the isothermal hold.

Odor Analysis:

Odor sensory analysis was performed by placing about 3 g of each sample in a 20 mL glass vial and equilibrating the sample at room temperature for at least 30 min. After equilibration, each vial was opened and the headspace was sniffed (bunny sniff) by a trained grader to determine odor intensity and descriptor profile. Odor intensity was graded according to the following scale:

5=Very Strong
4=Strong
3=Moderate
2=Weak to Moderate
1=Weak
0=No odor

Polymeric Contamination Analysis:

Many sources of reclaimed polypropylene, especially reclaimed polypropylene originating from mixed-stream sources, may contain undesired polymeric contamination. Without wishing to be bound by any theory, polymeric contamination, for example polyethylene contamination in polypropylene, may influence the physical properties of the polymer due to the presence of heterogeneous phases and the resulting weak interfaces. Furthermore, the polymeric contamination may also increase the opacity of the polymer and have an influence on the color. Thus, measuring the amount of polymeric contamination is important when determining the effectiveness of a method for purifying polymers.

Semi-crystalline polymeric contamination was evaluated using Differential Scanning calorimetry (DSC). To measure the amount of polyethylene contamination in polypropylene, a set of five polypropylene/polyethylene blends were prepared with 2, 4, 6, 8, and 10 wt % of Formolene® HB5502F HDPE (Formosa Plastics Corporation, USA) in Pro-fax 6331 polypropylene (LyondellBasell Industries Holdings, B.V.). Approximately 5-15 mg of each sample was sealed in an aluminum DSC pan and analyzed on a TA Instruments model Q2000 DSC with the following method:

1. Equilibrate at 30.00° C.
2. Ramp 20.00° C./min to 200.00° C.
3. Mark end of cycle 0
4. Ramp 20.00° C./min to 30.00° C.
5. Mark end of cycle 1
6. Ramp 20.00° C./min to 200.00° C.
7. Mark end of cycle 2
8. Ramp 20.00° C./min to 30.00° C.
9. Mark end of cycle 3
10. Ramp 5.00° C./min to 200.00° C.
11. Mark end of cycle 4

Figure 2:
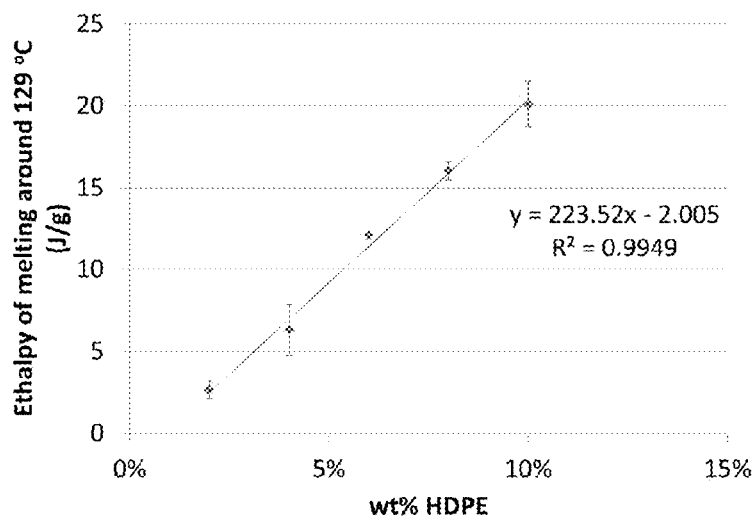
FIG. 2 is a calibration curve for the calculation of polyethylene content in polypropylene using enthalpy values from DSC measurements.

The enthalpy of melting for the HDPE peak around 128° C. was calculated for each sample of known HDPE content using the 5.00° C./min DSC thermogram. A linear calibration curve, shown in FIG. 2, was established plotting enthalpy of melting versus known HDPE concentration (wt %).

Samples having unknown PE content were analyzed using the same aforementioned DSC equipment and method. PE content was calculated using the aforementioned calibration curve. The specific HDPE used to generate the calibration curve will more than likely have a different degree of crystallinity than the polyethylene (or polyethylene blend) contamination that may be present in a reclaimed polypropylene sample. The degree of crystallinity may independently influence the measured enthalpy of melting for polyethylene and thus influence the resulting calculation of polyethylene content. However, the DSC test method described herein is meant to serve as a relative metric to compare the effectiveness of different methods to purify polymers and is not meant to be a rigorous quantification of the polyethylene content in a polymer blend. While the aforementioned method described the measurement of polyethylene contamination in polypropylene, this method may be applied to measurement of other semi-crystalline polymers using different temperature ranges and peaks in the DSC thermogram. Furthermore, alternative methods, such as nuclear magnetic resonance (NMR) spectroscopy, may also be used to measure the amount of both semi-crystalline and amorphous polymeric contamination in a sample.

EXAMPLES

The following examples further describe and demonstrate embodiments within the scope of the present invention. The examples are given solely for the purpose of illustration and are not to be construed as limitations of the present invention, as many variations thereof are possible without departing from the spirit and scope of the invention.

Example 1 le;.5qA sample of post-consumer derived recycled polypropylene mixed color flake was sourced from a supplier of recycled resins. The post-consumer recycled polypropylene originated from the United States and Canada. The as-received, mixed-color flake was homogenized via compounding on a Century/W&P ZSK30 twin screw extruder equipped with two 30 mm general purpose screws each with standard mixing and conveying elements. The screw rotation speed was about 50 rpm, the feeder throughput was about 20 lbs/hour (9.07 kg/hour) and the temperature of the barrel ranged from about 210° C. at the die to about 150° C. at the feed throat. The gray strand exiting the extruder was cooled in a room-temperature water bath, dried with air, and chopped into pellets.

The sample was characterized using the test methods disclosed herein and the resulting data are summarized in Table 1. The purpose of this example is to show the properties of a representative post-consumer derived recycled resin before purification.

Figure 4:
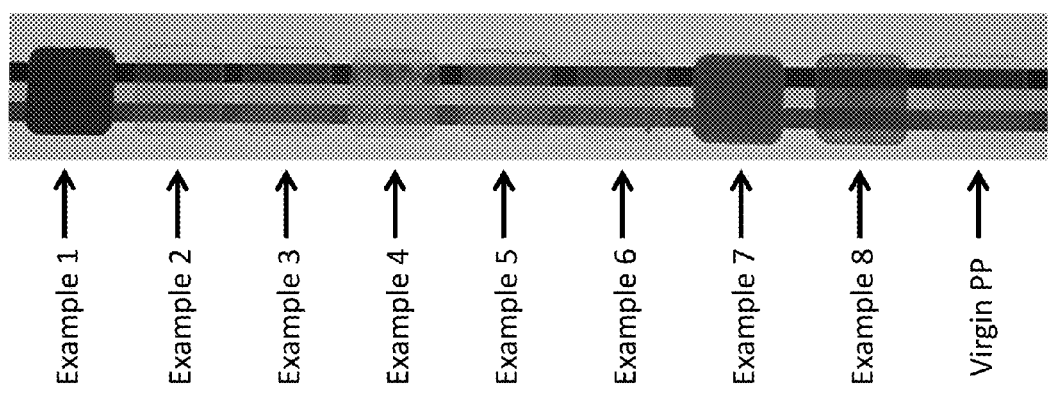
FIG. 4 is a photograph of the example specimens.

The pellets and corresponding square test specimens were dark gray in color as indicated in the L*a*b* values of the square test specimens. The opacity of the samples averaged about 100% opaque (i.e. no translucency). A photograph of the square test specimen is shown in FIG. 4 as Example 1. As shown in FIG. 4, the specimen was dark in color and lacked translucency.

This example serves as a representative baseline for heavy metal contamination found in post-consumer derived recycled polypropylene. When compared to other examples, the heavy metal contamination was found to be much greater in the as-received post-consumer derived recycled polypropylene.

The samples of example 1 had ash content values that averaged to about 1.2117 wt %, which also serves as a baseline for the amount of non-combustible substances that are often present in post-consumer derived recycled polypropylene.

This example also serves as a representative baseline for odor compound contamination found in post-consumer derived recycled polypropylene. The samples of example 1 were found to have an odor intensity of 3.75 on a 5 point scale (5 being the most intense), and were described as having a "garbage", "dusty", or "sour" odor.

This example also serves as a representative baseline for polyethylene contamination found in post-consumer derived recycled polypropylene. The samples of example 1 had polyethylene contents that averaged to about 5.5 wt %.

Example 2

Figure 3:
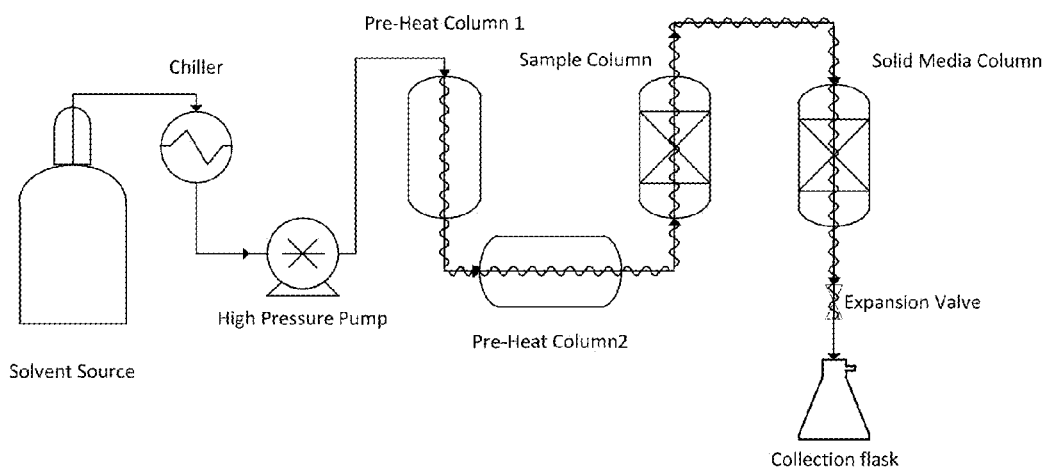
FIG. 3 is a schematic of the experimental apparatus used in the examples.

The sample of post-consumer derived recycled polypropylene mixed-color flake described in Example 1 was processed using the experimental apparatus shown in FIG. 3 and the following procedure:

1. 237 g of the mixed color flake was loaded into a 1.1 L extraction column pressure vessel with an internal diameter (ID) of 1.75" (4.45 cm) and a length of 28" (71.12 cm) that was heated to an external skin temperature of 175° C.
2. Liquid n-butane solvent was pressurized to about 2,150 psig (14.82 MPa) using a positive displacement pump and pre-heated to a temperature of about 110° C. using two heat exchangers before it was introduced to the bottom of the extraction column.
3. The fluid stream leaving the top of the extraction column was introduced into the top of a second 0.5 L pressure vessel with an ID of 2" (5.08 cm) and a length of about 8.5" (21.59 cm) that was heated to an external skin temperature of 175° C. The second pressure vessel contained 150 mL of silica gel (Silicycle Ultra Pure Silica Gels, SiliaFlash GE60, Parc-Technologies, USA) that was pre-mixed in a beaker with 150 mL of aluminum oxide (Activated Alumina, Selexsorb CDX, 7×14, BASF, USA).
4. The fluid stream leaving the bottom of the second pressure vessel was depressurized across an expansion valve into a side-arm Erlenmeyer flask. After depressurizing the fluid stream into the Erlenmeyer flask, the solvent vapor was vented through the side-arm port and any liquids/solids were collected in the flask. The n-butane solvent was eluted through the system at 2,150 psig (14.82 MPa) until no further material was observed accumulating in the flask. 19.93 g of white solids were collected and labeled 'Fraction 1'.
5. The Erlenmeyer flask was replaced with an empty, clean flask and the system pressure was then increased to 2,400 psig (16.55 MPa).
6. The system pressure was maintained at 2,400 psig (16.55 MPa) until no further solid material was observed eluting from the system. 89.35 g of white solids were collected and labeled 'Fraction 2'.
7. The Erlenmeyer flask was replaced with an empty, clean flask and the system pressure was then increased to 2,500 psig (17.24 MPa).
8. The system pressure was maintained at 2,500 psig (17.24 MPa) until no further solid material was observed eluting from the system. 58.18 g of white solids were collected and labeled 'Fraction 3'.
9. The Erlenmeyer flask was replaced with an empty, clean flask and the system pressure was then increased to 2,600 psig (17.93 MPa).
10. The system pressure was maintained at 2,600 psig (17.93 MPa) until no further solid material was observed eluting from the system. 7.29 g of white solids were collected and labeled 'Fraction 4'.
11. The Erlenmeyer flask was replaced with an empty, clean flask and the system pressure was then increased to 3,000 psig (20.68 MPa).
12. The system pressure was maintained at 3,000 psig (20.68 MPa) until no further solid material was observed eluting from the system. 5.58 g of off-white solids were collected and labeled 'Fraction 5'.
13. The samples collected in each flask were allowed to degas at room temperature and pressure for at least two days before being characterized using the test methods disclosed herein.

The data for the white solid material collected at 2,400 psig (16.55 MPa) as Fraction 2 are summarized in Table 1.

TABLE 1

Color, contamination, and odor removal of Examples 1-4

|  | Example 1 | Example 2 | Example 3 | Example 4 |
|---|---|---|---|---|
| Fraction | N/A | Fraction 2 | Fraction 2 | Fraction 1 |
| Solid Media | N/A | 150 mL of silica gel | 150 mL of silica gel | 150 mL of silica gel |

TABLE 1-continued

Color, contamination, and odor removal of Examples 1-4

| | Example 1 | Example 2 | Example 3 | Example 4 |
|---|---|---|---|---|
| | | mixed with 150 mL of aluminum oxide | mixed with 150 mL of aluminum oxide | mixed with 150 mL of aluminum oxide |
| Color L* | 39.76 ± 0.24 (n = 3) | 85.29 ± 0.17 (n = 3) | 84.57 ± 0.39 (n = 3) | 82.18 ± 0.99 (n = 3) |
| Color a* | −2.51 ± 0.04 (n = 3) | −0.69 ± 0.02 (n = 3) | −0.68 ± 0.04 (n = 3) | −0.93 ± 0.14 (n = 3) |
| Color b* | −1.20 ± 0.11 (n = 3) | 2.27 ± 0.08 (n = 3) | 3.08 ± 0.10 (n = 3) | 3.40 ± 0.48 (n = 3) |
| Opacity (Y) | 100.19 ± 0.15 (n = 3) | 7.90 ± 0.19 (n = 3) | 9.58 ± 0.94 (n = 3) | 22.18 ± 6.93 (n = 3) |
| Na (ppb) LOQ = 100 ppb | 136,000 ± 109,000 (n = 6) | 2,630 ± 3130 (n = 5) | 36,100 ± 17,300 (n = 6) | 2,790 ± 1140 (n = 6) |
| Al (ppb) LOQ = 1000 ppb | 192,000 ± 17,300 (n = 6) | <LOQ | 50,800 ± 17,300 (n = 6) | 3,160 ± 1,710 (n = 6) |
| Ca (ppb) LOQ = 1000 ppb | 1,590,000 ± 79,500 (n = 6) | 2,680 ± 2,439 (n = 5) | 13,100 ± 4,580 (n = 6) | 4,710 ± 1,650 (n = 6) |
| Ti (ppb) LOQ = 100 ppb | 2,800,000 ± 28,000 (n = 6) | 638 ± 70 (n = 5) | 755 ± 219 (n = 6) | 9,710 ± 6,210 (n = 6) |
| Cr (ppb) LOQ = 10 ppb | 4,710 ± 612 (n = 6) | 17.5 ± 20.5 (n = 5) | 130 ± 49 (n = 6) | 97.7 ± 89.9 (n = 6) |
| Fe (ppb) LOQ = 1000 ppb | 108,000 ± 1,080 (n = 6) | <LOQ | <LOQ | 1,300 ± 1,300 (n = 6) |
| Ni (ppb) LOQ = 10 ppb | 1,160 ± 151 (n = 6) | 10.9 ± 7.3 (n = 5) | 59.8 ± 23.3 (n = 6) | 45.4 ± 49.9 (n = 6) |
| Cu (ppb) LOQ = 10 ppb | 15,300 ± 612 (n = 6) | 33.0 ± 17.2 (n = 5) | 32.7 ± 13.7 (n = 6) | 242 ± 99.2 (n = 6) |
| Zn (ppb) LOQ = 10 ppb | 71,000 ± 1,420 (n = 6) | 261 ± 183 (n = 5) | 622 ± 454 (n = 6) | 1,060 ± 519 (n = 6) |
| Cd (ppb) LOQ = 10 ppb | 1,620 ± 113 (n = 6) | <LOQ | <LOQ | 10.8 ± 7.24 (n = 6) |
| Pb (ppb) LOQ = 10 ppb | 12,166 ± 243 (n = 6) | <LOQ | <LOQ | 80.0 ± 43.2 (n = 6) |
| Ash Content (% res from TGA) | 1.2117 ± 0.1501 (n = 3) | 0.2897 ± 0.1533 (n = 3) | 0.1614 ± 0.0833 (n = 3) | 0.2812 ± 0.1342 (n = 3) |
| Odor Intensity (0-5) | 3.75 | 0.5 | 3 | 2.25 |
| Odor Descriptor | garbage, dusty, sour | plastic, gasoline | plastic, solvent | minty/camphor, sour, plastic, burnt |
| PE content (wt %) DSC method LOQ = 1% | 5.5 ± 0.3% (n = 3) | <LOQ | <LOQ | 1.9 ± 0.6% (n = 3) |

TABLE 2

Color, contamination, and odor removal of Examples 5-8

| | Example 5 | Example 6 | Example 7 | Example 8 |
|---|---|---|---|---|
| Fraction | Fraction 2 | Fractions 1 & 2 from | Fraction 2 | N/A |
| Solid Media | 180 mL of silica gel | Example 3 combined with 150 mL of silica gel mixed with 150 mL of aluminum oxide | None | Fuller's Earth |
| Color L* | 82.00 ± 0.82 (n = 3) | 84.51 ± 0.21 (n = 3) | 50.51 ± 0.49 (n = 3) | 63.15 (n = 1) |
| Color a* | −0.84 ± 0.09 (n = 3) | −0.82 ± 0.07 (n = 3) | −3.09 ± 0.14 (n = 3) | 0.27 (n = 1) |
| Color b* | 3.40 ± 0.13 (n = 3) | 3.00 ± 0.22 (n = 3) | 10.23 ± 1.61 (n = 3) | 5.79 (n = 1) |
| Opacity (Y) | 18.63 ± 2.04 (n = 3) | 9.14 ± 0.47 (n = 3) | 87.20 ± 2.01 (n = 3) | 24.96 (n = 1) |
| Na (ppb) LOQ = 100 ppb | 2,960 ± 829 (n = 5) | 19,700 ± 11,600 (n = 6) | 33,300 ± 4660 (n = 3) | 5,120 ± 410 (n = 2) |
| Al (ppb) LOQ = 1000 ppb | 2,070 ± 124 (n = 5) | 3,610 ± 1,910 (n = 6) | 43,500 ± 1740 (n = 3) | 109,000 ± 2,180 (n = 2) |
| Ca (ppb) LOQ = 1000 ppb | 2,740 ± 493 (n = 5) | 8,490 ± 4,670 (n = 6) | 13,100 ± 4590 (n = 3) | 15,600 ± 312 (n = 2) |
| Ti (ppb) LOQ = 100 ppb | 10,400 ± 936 (n = 5) | 2,180 ± 1,110 (n = 6) | 864,000 ± 25,900 (n = 3) | 64,100 ± 135 (n = 2) |
| Cr (ppb) LOQ = 10 ppb | 47.6 ± 28.6 (n = 5) | 239 ± 206 (n = 6) | 996 ± 189 (n = 3) | 757 ± 204 (n = 2) |
| Fe (ppb) LOQ = 1000 ppb | <LOQ | 1,040 ± 967 (n = 6) | 19,300 ± 965 (n = 3) | 55,700 ± 557 (n = 2) |
| Ni (ppb) LOQ = 10 ppb | 38.6 ± 33.2 (n = 5) | 208 ± 245 (n = 6) | 148 ± 20.7 (n = 3) | 218 ± 0.196 (n = 2) |
| Cu (ppb) LOQ = 10 ppb | 64.7 ± 4.53 (n = 5) | 144 ± 232 (n = 6) | 2,890 ± 86.7 (n = 3) | 639 ± 345 (n = 2) |
| Zn (ppb) LOQ = 10 ppb | 803 ± 88.3 (n = 5) | 652 ± 267 (n = 6) | 19,600 ± 7250 (n = 3) | 2,950 ± 443 (n = 2) |
| Cd (ppb) LOQ = 10 ppb | 13.0 ± 6.50 (n = 5) | <LOQ | 389 ± 121 (n = 3) | 30.7 ± 1.23 (n = 2) |
| Pb (ppb) LOQ = 10 ppb | 118 ± 135 (n = 5) | 24.0 ± 13.0 (n = 6) | 1,310 ± 236 (n = 3) | 121 ± 0.061 (n = 2) |
| Ash Content (% res from TGA) | 0.5723 ± 0.0610 (n = 3) | 0.4951 ± 0.2448 (n = 3) | 0.3154 ± 0.0024 (n = 3) | 0.3294 ± 0.0948 (n = 3) |
| Odor Intensity (0-5) | 4 | 3.75 | 1 | 5 |
| Odor Descriptor | dirty, oily, minty/camphor | chlorine, plastic, oily, greasy | plastic, petroleum | gasoline |
| PE content (wt %) DSC method LOQ = 1% | 1.7 ± 0.3% (n = 3) | <LOQ | 1.2 ± 0.1% (n = 3) | 5.5 ± 0.1% (n = 3) |

The solids isolated in fractions 1-5 in this example were white in color. When the white solids from fraction 2 were compression molded into square test specimens, the specimens were colorless and clear and similar in appearance to virgin polypropylene. A photograph of the square test specimens is shown in FIG. 4 as Example 2. As shown in FIG. 4, the specimen was clear and comparable in color and translucency to virgin polypropylene. The L*a*b* values showed that the square test specimens were essentially colorless and showed a dramatic improvement in color relative to the square test specimens of example 1 (i.e. as-received post-consumer derived polypropylene). The L* values for the square test specimens from fraction 2 of example 2 averaged 85.29 which were much improved when compared to the L* values for the square test specimens of example 1, which averaged 39.76. The opacity for the square test specimens from fraction 2 of example 2, which averaged 7.90% opaque (i.e. about 92% translucent), were also much improved when compared to the opacity values for the square test specimens of example 1, which averaged about 100% opaque.

The concentration of heavy metal contamination for the samples from fraction 2 of example 2 were also much improved when compared to the samples of example 1. For example, the concentration of sodium in the samples from fraction 2 of example 2 averaged only 2,630 ppb while the concentration of sodium in the samples of example 1 averaged 136,000 ppb (a reduction of about 98%). The concentrations of aluminum, iron, cadmium, and lead were all below the limit of quantitation for the samples from fraction 2 of example 2 while the concentration of the same elements in the samples of example 1 averaged 192,000, 108,000, 1,620, and 12,166 ppb, respectively. The concentrations of all of the other elements measured (calcium, titanium, chromium, nickel, copper, and zinc) were all reduced by greater than 99% for the samples from fraction 2 of example 2 relative to the samples of example 1.

The samples from fraction 2 of example 2 had ash content values that averaged to about 0.2897 wt %, which were significantly lower than the ash content values for the samples of example 1, which averaged to about 1.2117 wt %.

The samples from fraction 2 of example 2 were found to have an odor intensity of 0.5 on a 5 point scale (5 being most intense), which was much improved when compared to the odor intensity of the samples of example 1, which had an odor intensity of 3.75. Though low in odor intensity, the samples from fraction 2 of example 2 were described as having a "plastic" or "gasoline" like odor similar to virgin polypropylene.

Any polyethylene content in the samples from fraction 2 of example 2 was below the limit of quantitation, which was much improved when compared to the polyethylene content of the samples of example 1, which averaged to about 5.5 wt %.

Figure 5:
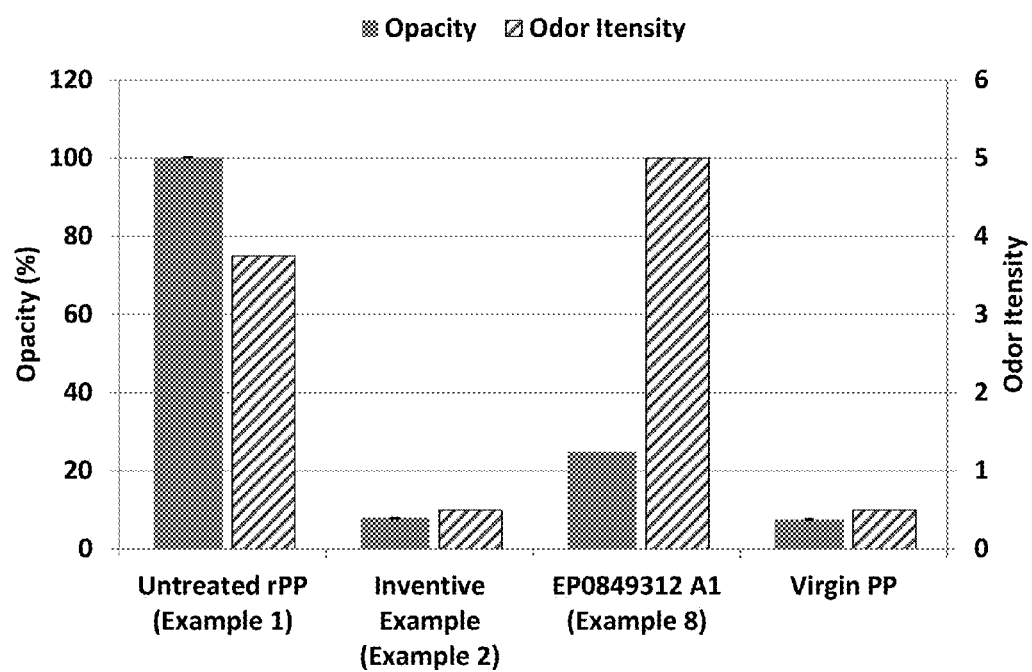
FIG. 5 is a bar chart of the opacity and odor intensity of several examples.

FIG. 5 is a bar chart of the opacity and odor intensity of the purified recycled polypropylene of example 2 compared to the untreated recycled polypropylene (example 1), the recycled polypropylene treated according to method disclosed in EP0849312 Al (example 8), and a virgin polypropylene comparative sample. As shown in FIG. 5, the purified recycled polypropylene of example 2 had both a low opacity and a low odor intensity and was similar to the virgin polypropylene comparative sample.

Example 3

The sample of post-consumer derived recycled polypropylene mixed color flake described in Example 1 was processed using the experimental apparatus shown in FIG. 3 and the following procedure:
1. 225 g of the mixed color flake was loaded into a 1.1 L extraction column pressure vessel with an internal diameter (ID) of 1.75" (44.45 mm) and a length of 28" (71.12 cm) that was heated to an external skin temperature of 135° C.
2. Liquid n-butane solvent was pressurized to about 1,000 psig (6.89 MPa) using a positive displacement pump and pre-heated to a temperature of about 90° C. using two heat exchangers before it was introduced to the bottom of the extraction column.
3. The fluid stream leaving the top of the extraction column was introduced into the top of a second 0.5 L pressure vessel with an ID of 2" (5.08 cm) and a length of about 8.5" (21.59 cm) that was heated to an external skin temperature of 135° C. The second pressure vessel contained 150 mL of silica gel (Silicycle Ultra Pure Silica Gels, SiliaFlash GE60, Parc-Technologies, USA) that was pre-mixed in a beaker with 150 mL of aluminum oxide (Activated Alumina, Selexsorb CDX, 7×14, BASF, USA).
4. The fluid stream leaving the bottom of the second pressure vessel was depressurized across an expansion valve into a side-arm Erlenmeyer flask. After depressurizing the fluid stream into the Erlenmeyer flask, the solvent vapor was vented through the side-arm port and any liquids/solids collected in the flask. The n-butane solvent was eluted through the system at 1,000 psig (6.89 MPa) until no further material was observed accumulating in the flask. 27.52 g of off-white solids were collected and labeled 'Fraction 1'.
5. The Erlenmeyer flask was replaced with an empty, clean flask and the system pressure was then increased to 1,500 psig (10.34 MPa).
6. The system pressure was maintained at 1,500 psig (10.34 MPa) until no further solid material was observed eluting from the system. 59.25 g of off-white solids were collected and labeled 'Fraction 2'.
7. The fraction 2 sample collected at 1,500 psig (10.34 MPa) was then allowed to degas at room temperature and pressure for at least two days before it was characterized using the test methods disclosed herein.

The data for the fraction 2 sample collected at 1,500 psig (10.34 MPa) are summarized in Table 1.

The solids isolated in fraction 2 in this example were slightly off-white in color. When these solids were compression molded into square test specimens, the specimens from fraction 2 were nearly colorless and clear and almost similar in appearance to virgin polypropylene. A photograph of the square test specimen is shown in FIG. 4 as Example 3. As shown in FIG. 4, the specimen was clear and comparable in color and translucency to virgin polypropylene. The L*a*b* values also showed that the square test specimens from fraction 2 were essentially colorless and showed a dramatic improvement in color relative to the square test specimens of example 1 (i.e. as-received post-consumer derived polypropylene). The L* values for the square test specimens from fraction 2 of example 3 averaged 84.57 which were much improved when compared to the L* values for the square test specimens of example 1, which averaged 39.76. The opacity for the square test specimens from fraction 2 of example 3, which averaged 9.58% opaque (i.e. about 90% translucent), were also much improved when compared to the opacity values for the square test specimens of example 1, which averaged about 100% opaque.

The concentration of heavy metal contamination for the samples from fraction 2 of example 3 were also much improved when compared to the samples of example 1. For example, the concentrations of sodium in the samples from fraction 2 of example 3 averaged 36,100 ppb while the concentrations of sodium in the samples of example 1 averaged 136,000 ppb (a reduction of about 74%). The concentrations of iron, cadmium, and lead were all below the limit of quantitation for the samples from fraction 2 of example 3 while the concentrations of the same elements in the samples of example 1 averaged 108,000, 1,620, and 12,166 ppb, respectively. The concentrations of calcium, titanium, chromium, nickel, copper, and zinc were all reduced by greater than 95% for the samples from fraction 2 of example 3 relative to the samples of example 1. The concentration of aluminum was reduced by about 74% in the same comparison.

The samples from fraction 2 of example 3 had ash content values that averaged to about 0.1614 wt %, which was significantly lower than the ash content values for the samples of example 1, which averaged to about 1.2117 wt %.

The samples from fraction 2 of example 3 were found to have an odor intensity of 3 on a 5 point scale (5 being most intense), which was slightly improved when compared to the odor intensity of the samples of example 1, which had an odor intensity of 3.75. The samples from fraction 2 of example 3 had an odor described as being like "plastic" or "solvent."

Any polyethylene content in the samples from fraction 2 of example 3 was below the limit of quantitation, which was much improved when compared to the polyethylene content of the samples of example 1, which averaged to about 5.5 wt %.

Example 4

The sample of post-consumer derived recycled polypropylene mixed color flake described in Example 1 was processed using the experimental apparatus shown in FIG. 3 and the following procedure:

1. 236 g of the mixed color flake was loaded into a 1.1 L extraction column pressure vessel with an internal diameter (ID) of 1.75" (44.45 mm) and a length of 28" (71.12 cm) that was heated to an external skin temperature of 175° C.
2. Liquid hexanes (mixed isomers) solvent was pressurized to about 200 psig (1.38 MPa) using a positive displacement pump and pre-heated to a temperature of about 110° C. using two heat exchangers before it was introduced to the bottom of the extraction column.
3. The fluid stream leaving the top of the extraction column was introduced into the top of a second 0.5 L pressure vessel with an ID of 2" (50.8 mm) and a length of about 8.5" (21.59 cm) that was heated to an external skin temperature of 175° C. The second pressure vessel contained 150 mL of silica gel (Silicycle Ultra Pure Silica Gels, SiliaFlash GE60, Parc-Technologies, USA) that was pre-mixed in a beaker with 150 mL of aluminum oxide (Activated Alumina, Selexsorb CDX, 7×14, BASF, USA).
4. The fluid stream leaving the bottom of the second pressure vessel was depressurized across an expansion valve into a side-arm Erlenmeyer flask. After depressurizing the fluid stream into the Erlenmeyer flask, the liquids/solids solution was collected in the flask. The hexanes solvent was eluted through the system at 200 psig (1.38 MPa) until no further material was observed accumulating in the flask. 102.11 g of off-white solids were collected (after solvent evaporation) and labeled 'Fraction 1'.
5. The Erlenmeyer flask was replaced with an empty, clean flask and the system pressure was then increased to 300 psig (2.07 MPa).
6. The system pressure was maintained at 300 psig (2.07 MPa) until no further solid material was observed eluting from the system. 71.08 g of off-white solids were collected (after solvent evaporation) and labeled 'Fraction 2'.
7. The hexanes solvent was removed from all samples via evaporation and then the samples were allowed to degas at room temperature and pressure for at least two days before being characterized using the test methods disclosed herein.

The data for the fraction 1 sample collected at 200 psig (1.38 MPa) are summarized in Table 1.

The solids isolated in fraction 1 of this example were slightly off-white in color. When these fraction 1 solids were compression molded into square test specimens, the specimens were nearly colorless but were slightly cloudy in appearance. A photograph of the square test specimen is shown in FIG. 4 as Example 4. As shown in FIG. 4, the specimen had an improved color and opacity relative to example 1, however, the specimen also had a cloudy appearance when compared to virgin PP. The L*a*b* values showed the fraction 1 square test specimens were essentially colorless and showed an improvement in color relative to the square test specimens of example 1 (i.e. as-received post-consumer derived polypropylene). The L* values for the square test specimens from fraction 1 of example 4 averaged 82.18 which were much improved when compared to the L* values for the square test specimens of example 1, which averaged 39.76. The opacity for the square test specimens from fraction 1 of example 4, which averaged 22.18% opaque, were also improved when compared to the opacity values for the square test specimens of example 1, which averaged about 100% opaque. However, the opacity values for the square test specimens from fraction 1 of example 4 were not as improved as the opacity values for the square test specimens from fraction 2 of examples 2 and 3.

The concentration of heavy metal contamination for the samples from fraction 1 of example 4 were also much improved when compared to the samples of example 1. For example, the concentration of sodium in the samples from fraction 1 of example 4 averaged 2,790 ppb while the concentration of sodium in the samples of example 1 averaged 136,000 ppb (a reduction of about 97%). The concentrations of aluminum, calcium, titanium, chromium, iron, nickel, copper, zinc, cadmium, and lead were all reduced by greater than 96% for the samples from fraction 1 of example 4 relative to the samples of example 1.

The samples from fraction 1 of example 4 had ash content values that averaged to about 0.2812 wt %, which was significantly lower than the ash content values for the samples of example 1, which averaged to about 1.2117 wt %.

The samples from fraction 1 of example 4 were found to have an odor intensity of 2.25 on a 5 point scale (5 being most intense), which was improved when compared to the odor intensity of the samples of example 1, which had an odor intensity of 3.75. Though lower in intensity, the samples from fraction 1 of example 4 had odor described as being "minty", "sour", "plastic", and "burnt."

The samples from fraction 1 of example 4 had average polyethylene content values of about 1.9 wt %, which was improved when compared to the polyethylene content of the samples of example 1, which averaged to about 5.5 wt %.

Example 5

The sample of post-consumer derived recycled polypropylene mixed color flake described in Example 1 was processed using the experimental apparatus shown in FIG. 3 and the following procedure:

1. 233 g of the mixed color flake was loaded into a 1.1 L extraction column pressure vessel with an internal diameter (ID) of 1.75" (44.45 mm) and a length of 28" (71.12 cm) that was heated to an external skin temperature of 175° C.
2. Liquid n-butane solvent was pressurized to about 2,050 psig (14.13 MPa) using a positive displacement pump and pre-heated to a temperature of about 110° C. using two heat exchangers before it was introduced to the bottom of the extraction column.
3. The fluid stream leaving the top of the extraction column was introduced into the top of a second 0.5 L pressure vessel with an ID of 2" (50.8 mm) and a length of about 8.5" (21.59 cm) that was heated to an external skin temperature of 175° C. The second pressure vessel contained 180 mL of silica gel (Silicycle Ultra Pure Silica Gels, SiliaFlash GE60, Parc-Technologies, USA).
4. The fluid stream leaving the bottom of the second pressure vessel was depressurized across an expansion valve into a side-arm Erlenmeyer flask. After depressurizing the fluid stream into the Erlenmeyer flask, the solvent vapor was vented through the side-arm port and any liquids/solids collected in the flask. The n-butane solvent was eluted through the system at 2,050 psig (14.13 MPa) until no further material was observed accumulating in the flask. 12.87 g of white solids were collected and labeled 'Fraction 1'.
5. The Erlenmeyer flask was replaced with an empty, clean flask and the system pressure was then increased to 2,500 psig (17.24 MPa).
6. The system pressure was maintained at 2,500 psig (17.24 MPa) until no further solid material was observed eluting from the system. 162.43 g of white solids were collected and labeled 'Fraction 2'.
7. The sample collected at 2,500 psig (17.24 MPa) was then allowed to degas at room temperature and pressure for at least two days before it was characterized using the test methods disclosed herein.

The data for the fraction 2 sample collected at 2,500 psig (17.24 MPa) are summarized in Table 2.

The solids isolated from fraction 2 in this example were white to slightly off-white in color. When these fraction 2 solids were compression molded into square test specimens, the specimens were nearly colorless but were slightly cloudy in appearance. A photograph of the square test specimen is shown in FIG. 4 as Example 5. As shown in FIG. 4, the specimen had an improved appearance relative to example 1, but was slightly cloudy when compared to virgin PP. The L*a*b* values showed the square test specimens were essentially colorless and showed a dramatic improvement in color relative to the square test specimens of example 1 (i.e. as-received post-consumer derived polypropylene). The L* values for the square test specimens from fraction 2 of example 5 averaged 82.00 which were much improved when compared to the L* values for the square test specimens of example 1, which averaged 39.76. The opacity for the square test specimens from fraction 2 of example 5, which averaged about 18.63% opaque, were also improved when compared to the opacity values for the square test specimens of example 1, which averaged about 100% opaque. However, the opacity values for the square test specimens from fraction 2 of example 5 were not as improved as the opacity values for the square test specimens from fraction 2 of examples 2 and 3. Though not wishing to be bound by any theory, the applicants believe that the improved, but still cloudy appearance was due to the smaller charge of silica gel (i.e. shorter bed length) which allowed more contaminants to remain in the polymer collected.

The concentration of heavy metal contamination in the samples from fraction 2 of example 5 were also much improved when compared to the samples of example 1. For example, the concentration of sodium in the samples from fraction 2 of example 5 averaged 2,960 ppb while the concentration of sodium in the samples of example 1 averaged 136,000 ppb (a reduction of about 98%). The concentrations of iron in the samples from fraction 2 of example 5 were below the limit of quantitation while the concentrations of iron in the samples of example 1 averaged 108,000. The concentrations of aluminum, calcium, titanium, chromium, nickel, copper, zinc, cadmium, and lead were all reduced by greater than 97% for the samples from fraction 2 of example 5 relative to the samples of example 1.

The samples from fraction 2 of example 5 had ash content values that averaged to about 0.5723 wt %, which was lower than the ash content values for the samples of example 1, which averaged to about 1.2117 wt %.

The samples from fraction 2 of example 5 were found to have an odor intensity of 4 on a 5 point scale (5 being most intense), which was slightly higher when compared to the odor intensity of the samples of example 1, which had an odor intensity of 3.75. The samples from fraction 2 of example 5 had an odor described as "dirty", "oily", and "minty." Though not wishing to be bound by any theory, the applicants believe that the higher odor intensity of the samples of example 5 resulted from the absorption of odorant molecules into silica gel during the first extraction step (i.e. collection of Fraction 1). Due to the lower amount of silica gel (and thus shorter bed height) used in example 5, the absorbed odorant molecules likely eluted with the solids collected as Fraction 2.

The samples from fraction 2 of example 5 had polyethylene content values that averaged to about 1.7 wt %, which were improved when compared to the polyethylene content of the samples of example 1, which averaged to about 5.5 wt %.

Example 6

The samples of example 6 were produced by combining the fraction 1 white solids produced at 1,000 psig (6.89 MPa) in example 3 with the fraction 2 white solids produced at 1,500 psig (10.34 MPa) in example 3. The combined fraction 1 and fraction 2 sample was produced to demonstrate the performance of a method to purify polypropylene without the step of extracting any extractable contamination. The data for the combined fractions 1 and 2 of example 3 are summarized in Table 2.

When the solids of this example were compression molded into square test specimens, the specimens had an appearance similar to the square test specimens from fraction 2 of example 3. A photograph of the square test specimen is shown in FIG. 4 as Example 6. As shown in FIG. 4, the specimen was clear and comparable in color and translucency to virgin polypropylene. The L*a*b* values showed the square test specimens were essentially colorless and showed a dramatic improvement in color relative to the square test specimens of example 1 (i.e. as-received post-consumer derived polypropylene). The L* values for the square test specimens of example 6 averaged 84.51 which were much improved when compared to the L* values for the square test specimens of example 1, which averaged 39.76. The opacity for the square test specimens of example 6, which averaged 9.14% opaque (i.e. nearly 91% translucent), were also much improved when compared to the opacity values for the square test specimens of comparative example 1, which averaged about 100% opaque. The L*a*b* values and opacities of the square test specimens of example 6 were also similar to the L*a*b* values and opacities of the square test specimens from fraction 2 of example 3.

Similar to fraction 2 of example 3, the concentration of heavy metal contamination in the samples of example 6 were also much improved when compared to the samples of example 1. For example, the concentration of sodium in the samples of example 6 averaged 19,700 ppb while the concentration of sodium in the samples of example 1 averaged 136,000 ppb (a reduction of about 86%). The concentrations of aluminum, calcium, titanium, chromium, iron, nickel, copper, zinc, cadmium, and lead were all reduced by greater than 82% for the samples of example 6 relative to the samples of example 1.

The samples of example 6 had average ash content values of about 0.4951 wt %, which was lower than the average ash content values for the samples of example 1, of about 1.2117 wt %. When compared to the ash content values for the samples from fraction 2 of example 3, the ash content values for the samples of example 6 were slightly higher.

The samples of example 6 were found to have an odor intensity of 3.75 on a 5 point scale (5 being most intense), which was similar to the odor intensity of the samples of example 1, which had an odor intensity of 3.75 as well. The samples of example 6 had odor described as "chlorine", "plastic", "oily", and "greasy." When compared to the samples from fraction 2 of example 3, the samples of example 6 had a more intense odor.

Similar to fraction 2 of example 3, any polyethylene content in the samples of example 6 was below the limit of quantitation, which was much improved when compared to the polyethylene content of the samples of example 1, which averaged to about 5.5 wt %.

Example 7

The purpose of this example was to demonstrate the inferior performance of a method to purify polypropylene without the step of contacting a polymer solution with solid media. The sample of post-consumer derived recycled polypropylene mixed color flake described in Example 1 was processed using the experimental apparatus shown in FIG. 3 and the following procedure:
1. 231 g of the mixed color flake was loaded into a 1.1 L extraction column pressure vessel with an internal diameter (ID) of 1.75" (44.45 mm) and a length of 28" (71.12 cm) that was heated to an external skin temperature of 175° C.
2. Liquid n-butane solvent was pressurized to about 2,000 psig (13.79 MPa) using a positive displacement pump and pre-heated to a temperature of about 110° C. using two heat exchangers before it was introduced to the bottom of the extraction column.
3. The fluid stream leaving the top of the extraction column was introduced into the top of a second 0.5 L pressure vessel with an ID of 2" (50.8 mm) and a length of about 8.5" (21.59 cm) that was heated to an external skin temperature of 175° C. The second pressure vessel did not contain any solid media in this example.
4. The fluid stream leaving the bottom of the second pressure vessel was depressurized across an expansion valve into a side-arm Erlenmeyer flask. After depressurizing the fluid stream into the Erlenmeyer flask, the solvent vapor was vented through the side-arm port and any liquids/solids were collected in the flask. The n-butane solvent was eluted through the system at 2,000 psig (13.79 MPa) until no further material was observed accumulating in the flask. 20.82 g of tan solids were collected and labeled 'Fraction 1'.
5. The Erlenmeyer flask was replaced with an empty, clean flask and the system pressure was then increased to 2,500 psig (17.24 MPa).
6. The system pressure was maintained at 2,500 psig (17.24 MPa) until no further solid material was observed eluting from the system. 173.39 g of grayish white solids were collected and labeled 'Fraction 2'.
7. The fraction 2 sample collected at 2,500 psig (17.24 MPa) was then allowed to degas at room temperature and pressure for at least two days before it was characterized using the test methods disclosed herein.

The data for the fraction 2 sample collected at 2,500 psig (17.24 MPa) are summarized in Table 2.

The solids isolated in fraction 2 in this example were gray to off-white in color. When these fraction 2 solids were compression molded into square test specimens, the specimens were tan/light gray in appearance. A photograph of the square test specimen is shown in FIG. 4 as Example 7. As shown in FIG. 4, the specimen was slightly improved relative to example 1. Even without the solid media contact step, the L*a*b* values show that the square test specimens from fraction 2 of example 7 were slightly improved in color relative to the samples of example 1 (i.e. as-received post-consumer derived polypropylene). The L* values for the square test specimens from fraction 2 of example 7 averaged 50.51 which were slightly improved when compared to the L* values for the square test specimens of example 1, which averaged 39.76. The opacities for the square test specimens from fraction 2 of example 7, which averaged 87.20% opaque, were also slightly improved when compared to the opacity values for the square test specimens of example 1, which averaged about 100% opaque. Though not wishing to be bound by any theory, the slight improvement in the color values and opacities of the square test specimens of example 7 may be due to the extraction of polymer from the colorants and other materials responsible for appearance. Further, the applicants believe that the colorants and other materials may be left behind as a residuum after the polymer is extracted.

The concentration of heavy metal contamination in the samples from fraction 2 of example 7 were improved when compared to the samples of example 1. For example, the concentration of sodium in the samples from fraction 2 of example 7 averaged 33,300 ppb while the concentration of sodium in the samples of example 1 averaged 136,000 ppb (a reduction of about 76%). The concentrations of aluminum, calcium, titanium, chromium, iron, nickel, copper, zinc, cadmium, and lead were all reduced by greater than 69% for the samples from fraction 2 of example 7 relative to the samples of example 1. Though not wishing to be bound by any theory, the applicants believe that the reduction in heavy metals contamination results from the extraction of the polymer away from the contamination, which is left behind as a residuum after the polymer is extracted.

The samples from fraction 2 of example 7 had ash content values that averaged to about 0.3154 wt %, which was lower than the ash content values for the samples of example 1, which averaged to about 1.2117 wt %.

The samples from fraction 2 of example 7 were found to have an odor intensity of 1 on a 5 point scale (5 being most intense), which was much improved when compared to the odor intensity of the samples of example 1, which had an odor intensity of 3.75. The samples from fraction 2 of example 7 had odor described as being like "plastic" or "petroleum."

The samples from fraction 2 of example 7 had polyethylene content values that averaged to about 1.2 wt %, which was improved when compared to the polyethylene content of the samples of example 1, which averaged to about 5.5 wt %.

Example 8

The sample of post-consumer derived recycled polypropylene mixed color flake described in Example 1 was purified using a procedure based on the procedure described in EP0849312 A1.

20.00 g of post-consumer derived recycled polypropylene mixed color flake was combined with 400.04 g of white spirits (Sigma-Aldrich, USA) in a 1 L round-bottomed flask. The mixture was held at room temperature for 22 hours with occasional stirring. The white spirits was then decanted from the polymer. 402.60 g of fresh white spirits was added to the flask containing the polymer. The mixture was then heated and held at 140° C. for 90 min under reflux. The resulting hot solution was vacuum filtered through a 70 mm ID Buchner funnel with a layer of glass wool as the filtration medium. About 300 mL of filtrate was collected and allowed to cool to room temperature. The resulting gray precipitate was isolated via vacuum filtration through a 70 mm ID Buckner funnel with shark skin filter paper. The gray precipitate was combined with 2.01 g of Fuller's earth (Sigma-Aldrich, USA) and 195.21 g of fresh white spirits in a 1 L round-bottomed flask and then heated and held at 140° C. for 30 min under reflux. The resulting hot solution was vacuum filtered through a 5.5 cm ID Buchner funnel with shark skin filter paper. The filtrate was allowed to cool to room temperature. The resulting light gray precipitate was isolated via vacuum filtration through a 5.5 cm ID Buchner funnel with shark skin filter paper. The isolated precipitate was dried in a vacuum oven at 25° C. for about 18 hours. About 4.82 g of dried precipitate was isolated. The isolated precipitate was then extracted with acetone for 30 min using a Soxhlet extraction apparatus equipped with a cellulose extraction thimble. The extracted material was dried in a vacuum oven at 25° C. for about 19 hours. 3.4654 g of material was recovered. The sample was characterized using the test methods disclosed herein and the resulting data are summarized in Table 2.

The solids isolated in this example were light gray to off-white in color. When these solids were compression molded into square test specimens, the specimens had a smoky, faint-gray appearance. A photograph of the square test specimen is shown in FIG. 4 as Example 8. As shown in FIG. 4, the specimen was improved but remained dark in color was not as clear and translucent as virgin PP. The L*a*b* value showed the sample color was improved relative to the samples of example 1 (i.e. as-received post-consumer derived polypropylene). The L* value for the sample of example 8 was 63.15 which was improved when compared to the L* values for the sample of example 1, which averaged 39.76. However, the L* value for the sample of example 8 demonstrates that the method described in EP0849312 A1 does not produce a sample that is as bright and colorless as samples from some of the embodiments of the present invention. The opacity for the sample of example 8 was 24.96% opaque, which was improved when compared to the opacity values for the sample of example 1, which averaged about 100% opaque. The opacity value also shows that the sample of example 8 was not as translucent as some of the embodiments of the present invention.

The concentration of heavy metal contamination in the sample of example 8 was improved when compared to the samples of example 1. For example, the concentration of sodium in the sample of example 8 was 5,120 ppb while the concentration of sodium in the samples of example 1 averaged 136,000 ppb (a reduction of about 96%). The concentrations of aluminum, calcium, titanium, chromium, iron, nickel, copper, zinc, cadmium, and lead were all reduced by greater than 43% for the sample of example 8 relative to the samples of example 1.

The sample of example 8 had an ash content of about 0.3294 wt %, which was lower than the ash content values for the samples of example 1, which averaged to about 1.2117 wt %.

The samples of example 8 had an odor intensity of 5 on a 5 point scale (5 being most intense), which was much stronger when compared to the odor intensity of the samples of example 1, which had an odor intensity of 3.75. The samples of example 3 had odor described as being like "gasoline." The strong odor of this sample was due to the residual white sprits solvent used.

The sample of example 8 had average polyethylene content values of about 5.5 wt %, which was the same as the average polyethylene content of the samples of example 1 of about 5.5 wt %.

Virgin Polypropylene Comparative Samples

Pro-fax 6331 polypropylene (LyondellBasell Industries Holdings, B.V.) was used for all "Virgin PP" comparative samples. The pellets of virgin PP were processed into square test specimens according the method described herein. The L*a*b* values for the specimens made from virgin PP averaged to 85.13±0.18, −0.71±0.01, and 2.27±0.02, respectively The square test specimens had an average opacity of 7.56±0.21% opaque. The pellets of virgin PP had an odor intensity of 0.5 on a 5 point scale (5 being the most intense) and had odor described as being like "plastic."

Every document cited herein, including any cross reference or related patent or patent application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggest or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modification can be made without departing from the spirit and scope of the invention. It is therefore intended to cover in the appended claims all such changes and modification that are within the scope of the present invention.

What is claimed is:

1. A method for purifying a reclaimed polypropylene comprising:
   a. obtaining the reclaimed polypropylene wherein said reclaimed polypropylene is selected from the group consisting of post-consumer use polymers, post-industrial use polymers, and combinations thereof;
   b. contacting the reclaimed polypropylene at a temperature from about 80° C. to about 220° C. and at a pressure from about 150 psig (1.03 MPa) to about 15,000 psig (103.42 MPa) with a first fluid solvent having a standard boiling point less than about 70° C., to produce an extracted reclaimed polypropylene;
   c. dissolving the extracted reclaimed polypropylene in a solvent selected from the group consisting of the first fluid solvent, a second fluid solvent, and mixtures thereof, at a temperature from about 90° C. to about 220° C. and a pressure from about 350 psig (2.41 MPa) to about 20,000 psig (137.90 MPa) to produce a polypropylene solution;
   d. purifying said polypropylene solution at a temperature from about 90° C. to about 220° C. and at a pressure from about 350 psig (2.41 MPa) to about 20,000 psig (137.90 MPa) by contacting said polypropylene solution with solid media to produce a purer polypropylene solution; and
   e. separating a purer polypropylene from said purer polypropylene solution;
wherein said second fluid solvent has the same chemical composition or a different chemical composition as the first fluid solvent.

2. The method of claim 1, wherein the purer polypropylene is separated from said purer polypropylene solution at a temperature from about 0° C. to about 220° C. and a pressure from about 0 psig (0 MPa) to 2,000 psig (13.79 MPa).

3. The method of claim 1, wherein the reclaimed polypropylene is post-consumer recycle derived polypropylene.

4. The method of claim 1, wherein said reclaimed polypropylene is a polypropylene homopolymer or a primarily polypropylene copolymer.

5. The method of claim 1, wherein said fluid solvent has a standard boiling point less than about 0° C. and greater than about −45° C. and a standard enthalpy change of vaporization of less than about +25 kJ/mol.

6. The method of claim 1, wherein said fluid solvent is selected from the group consisting of olefinic hydrocarbons, aliphatic hydrocarbons, and mixtures thereof.

7. The method of claim 6, wherein said aliphatic hydrocarbon is selected from the group consisting of $C_1$-$C_6$ aliphatic hydrocarbons and mixtures thereof.

8. The method of claim 6, wherein said aliphatic hydrocarbons and mixtures thereof is comprised of primarily $C_4$ aliphatic hydrocarbons.

9. The method of claim 6, wherein said fluid solvent consists essentially of $C_4$ liquefied petroleum gas.

10. The method of claim 8, wherein said fluid solvent is n-butane, butane isomers, or mixtures thereof.

11. The method of claim 1, wherein said temperature in steps b, c, and d is from about 110° C. to about 170° C.

12. The method of claim 1, wherein said pressure in step b is from about 1,100 psig (7.58 MPa) to about 2,100 psig (14.48 MPa).

13. The method of claim 1, wherein said pressure in step b is less than about 1,100 psig (7.58 MPa).

14. The method of claim 1, wherein said pressure in step c is greater than about 1,100 psig (7.58 MPa).

15. The method of claim 1, wherein said pressure in step c is greater than about 2,100 psig (14.48 MPa).

16. The method of claim 1, wherein said solid media is selected from the group consisting of inorganic substances, carbon-based substances, and mixtures thereof.

17. The method of claim 16, wherein said inorganic substances are selected from the group consisting of oxides of silicon, oxides of aluminum, oxides of iron, aluminum silicates, amorphous volcanic glasses, and mixtures thereof.

18. The method of claim 17, wherein said inorganic substances are selected from the group consisting of silica gel, diatomite, sand, quartz, alumina, perlite, fuller's earth, bentonite, and mixtures thereof.

19. The method of claim 18, wherein said inorganic substance is reclaimed glass.

20. The method of claim 16, wherein said carbon-based substances are selected from the group consisting of anthracite coal, carbon black, coke, activated carbon, cellulose, and mixtures thereof.

21. The method of claim 1, wherein said contacting of the polypropylene solution with said solid media is done in a packed bed of said solid media.

22. The method of claim 21, where said packed bed is greater than 20 cm in length.

* * * * *